United States Patent [19]
Yokogawa et al.

[11] Patent Number: 5,608,715
[45] Date of Patent: Mar. 4, 1997

[54] MULTI-LAYERED RECORDING DISK AND RECORDING/REPRODUCING SYSTEM USING THE SAME

[75] Inventors: Fumihiko Yokogawa; Seiichi Ohsawa, both of Tsurugashima, Japan

[73] Assignee: Pioneer Electronic Corporation, Tokyo, Japan

[21] Appl. No.: 504,793

[22] Filed: Jul. 20, 1995

[30] Foreign Application Priority Data

Jul. 26, 1994 [JP] Japan ................................. 6-174511
Jun. 15, 1995 [JP] Japan ................................. 7-148907

[51] Int. Cl.$^6$ .................................................. G11B 7/24
[52] U.S. Cl. ........................ 369/275.1; 369/94; 369/281
[58] Field of Search ........................ 369/275.1, 275.3, 369/275.2, 275.5, 283, 284, 281, 280, 13, 94; 430/320, 321, 322, 323, 324; 428/64.4, 694 R

[56] References Cited

U.S. PATENT DOCUMENTS

| | | | |
|---|---|---|---|
| 5,255,262 | 10/1993 | Best et al. | 369/275.1 |
| 5,373,499 | 12/1994 | Imaino et al. | 369/275.1 |
| 5,381,401 | 1/1995 | Best et al. | 369/275.1 |
| 5,420,834 | 5/1995 | Finkelstein et al. | 369/13 |
| 5,446,723 | 8/1995 | Best et al. | 369/275.1 |
| 5,485,452 | 1/1996 | Maeda | 369/275.1 |
| 5,499,231 | 3/1996 | Fennema et al. | 369/275.1 |
| 5,511,057 | 4/1996 | Holtslag et al. | 369/275.1 |

FOREIGN PATENT DOCUMENTS 2-223030  9/1990  Japan .

*Primary Examiner*—Tan Dinh
*Attorney, Agent, or Firm*—Keck, Mahin & Cate

[57] ABSTRACT

A multi-layered disk which can improve a data recording density and also can record signals and allow reading and reproduction of the recorded signals in good conditions and a recording system as well as a reproducing system using the same and a multi-layered recording disk in which a plurality of data recording surfaces are laminated. In a band wherein, against an MTF level obtained when a read light is on-focus to one of the data recording surfaces, an MTF level obtained when the read light is defocusing to other data recording surfaces is 1/N (N is a real number larger than 1), data signals are recorded in each of the data recording surfaces. A distance t between each data recording surface, numerical aperture NA of an objective lens guiding a read light to any of the data recording surfaces, a wavelength $\lambda$ of the read light, an equivalent refractive index n between each data recording surface, and a number i of laminated data recording surfaces satisfy the following relation:

$$1.4\ n\lambda/(NA)^2 \geq t \geq 7.5\ n^3\lambda/\{(n^2-1)(NA)^4(i-1)\}.$$

26 Claims, 17 Drawing Sheets

FIG.2A
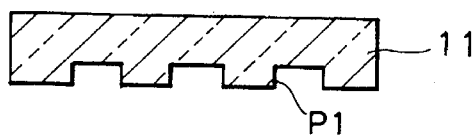
FIG.2B
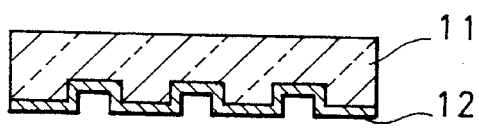
FIG.2C
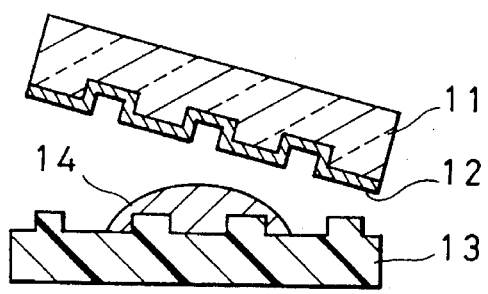
FIG.2D
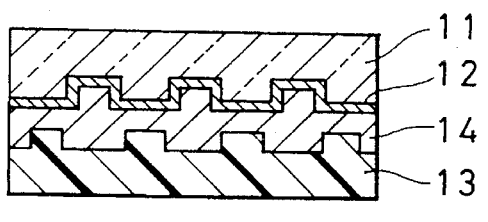
FIG.2E
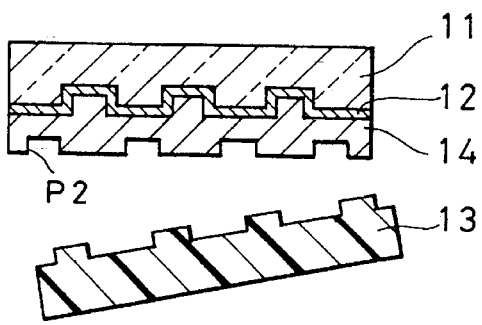
FIG.2F
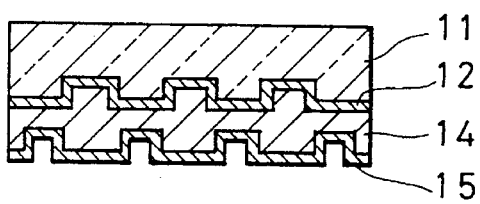
FIG.2G
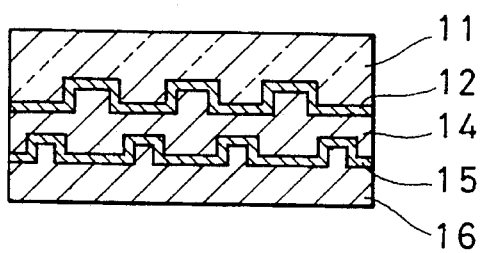

A LOWER LIMIT VALUE AS WELL AS AN UPPER LIMIT VALUE FOR t WHEN n IS 1.5, i IS 2, AND A DISTANCE t BETWEEN EACH DATA RECORDING SURFACE IS EQUAL.

| NA \ λ | 0.8 μm [μm] | 0.4 μm [μm] |
|---|---|---|
| 0.4 | $9.6 \leq t \leq 625$ | $4.0 \leq t \leq 312$ |
| 0.5 | $6.4 \leq t \leq 256$ | $3.0 \leq t \leq 128$ |
| 0.55 | $5.3 \leq t \leq 174$ | $2.6 \leq t \leq 87$ |
| 0.6 | $3.7 \leq t \leq 123$ | $1.8 \leq t \leq 62$ |

- 11
- 12B PHOTOCHROMIC REFLECTING FILM
- 14
- 15
- 16

- 33
- 31
- 32

OUTPUT OF DATA DETECTION

ON WHEN THE FIRST DATA RECORDING IS READ

FIG.19
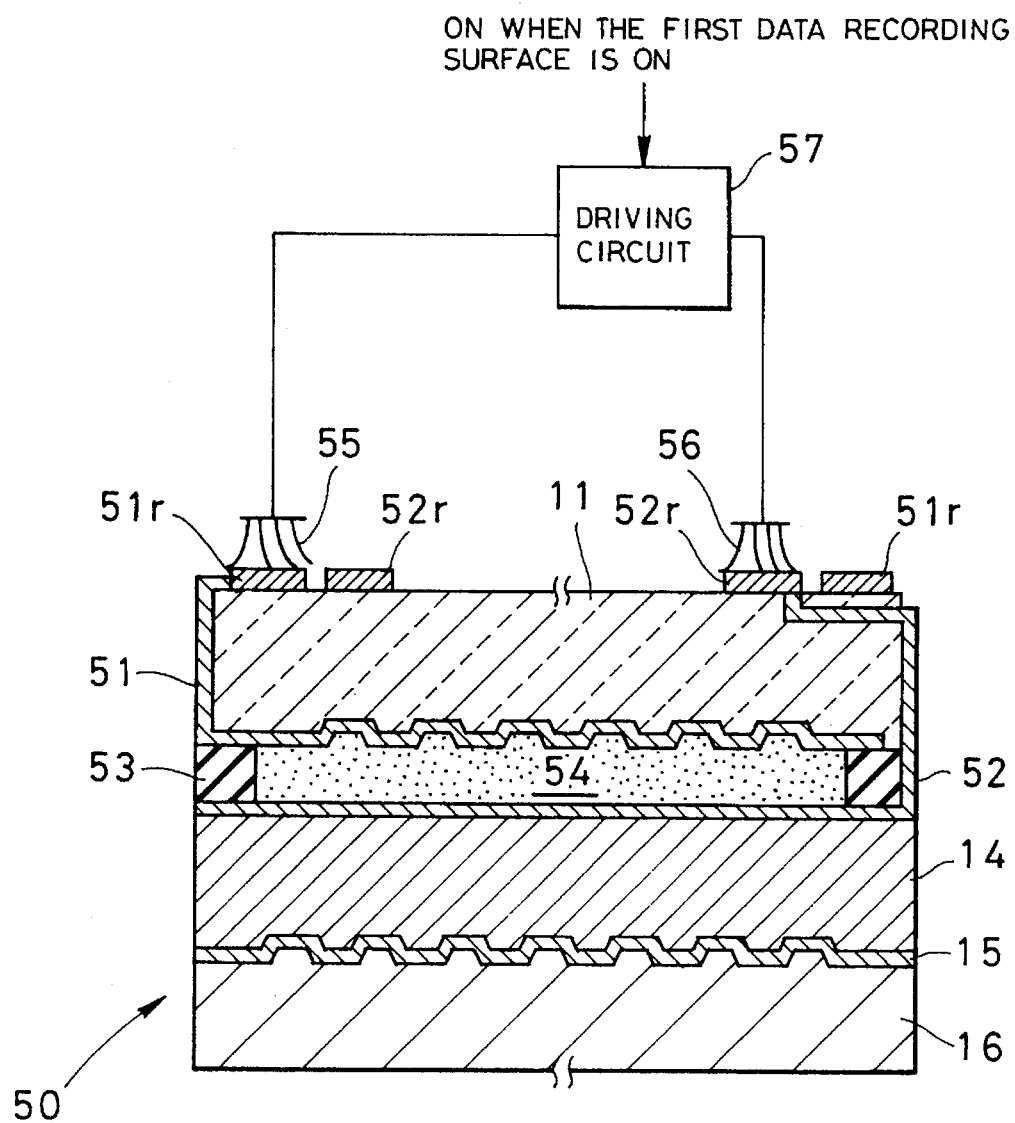
ON WHEN THE FIRST DATA RECORDING SURFACE IS ON
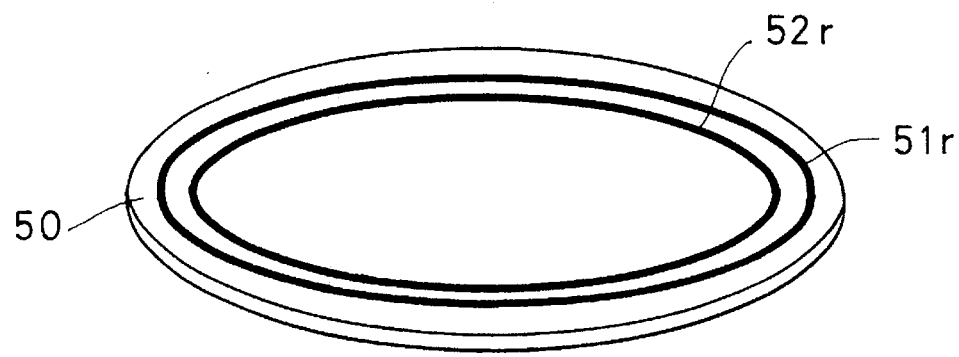

FIG. 22
FIRST DATA RECORDING LAYER (INITIAL SURFACE)
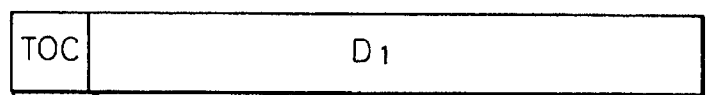
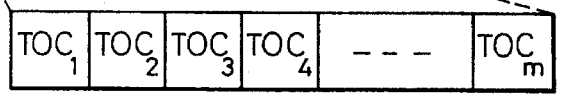
SECOND DATA RECORDING LAYER
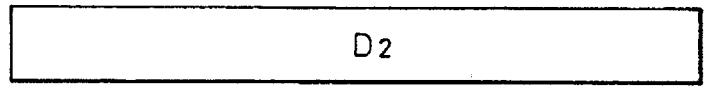
THIRD DATA RECORDING LAYER
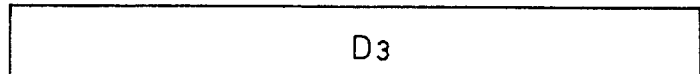
M-TH DATA RECORDING LAYER
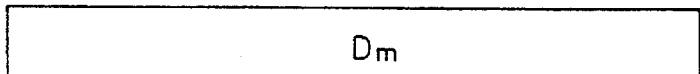

FIG.23
FIRST DATA
RECORDING LAYER
(INITIAL SURFACE)
SECOND DATA
RECORDING LAYER
THIRD DATA
RECORDING LAYER
M-TH DATA
RECORDING LAYER

MULTI-LAYERED RECORDING DISK AND RECORDING/REPRODUCING SYSTEM USING THE SAME

BACKGROUND OF THE INVENTION

1. Field of the Invention

The present invention relates to a disk-shaped recording medium, and more particularly to a multi-layered disk comprising a plurality of laminated data recording layers. Also the present invention relates to a system for recording signal in each of the data recording layers described above, and a system for reproducing signals recorded in each of the data recording layers.

2. Description of Background Information

High density storage of data in optical disks has been mainly realized by making higher a recording density in a recording surface of the disks. Also there have been made various types of effort for the same purpose by making shorter a track pitch or elevating a recording density in the linear velocity direction in scan for recording and reading in combination with efforts for making shorter a wavelength of light beam for recording emitted from a light source and signal processing in the reproducing system.

However, a wavelength of a light beam emitted from a light source can be made only in a ultraviolet region, and also pit size reduction is allowable only on the condition that the transcription to a disk can be executed in cutting, and it can be considered that the efforts for elevating a recording density in a two-dimensional region will reach a limit in the future.

A multi-layered disk formed by laminating data recording layers has been disclosed in Japanese Patent Laid-Open Publication No. H2-223030 (Japanese Patent Application No. H1-20999) or others to realize data recording at a higher density in a three-dimensional region, namely in the direction of thickness of a disk.

However, it has been turned out that the efforts are inadequate to further elevate a density of recorded data and to more smoothly record signals and reproduce the recorded signals.

OBJECT AND SUMMARY OF THE INVENTION

The present invention was made in the light of the circumstances described above, and it is an object of the present invention to further elevate a density of recorded data and to provide a multi-layered disk for smoothly recording signals and reproducing the recorded signals and a recording system as well as a reproducing system using the same.

The multi-layered recording disk according to the present invention is a multi-layered disk in which a plurality of data recording surfaces are laminated, and is characterized in that data signals recorded in each of the data recording surfaces in a band where, against a reproduction level obtained when a read beam is on focus to one of the data recording surfaces, a reproduction level obtained when the read beam is defocusing to other one of the data recording surface is $1/N$ ($N$ is a real number larger than 1), and a distance $t$ between each of the data recording surfaces, numerical aperture NA of an objective lens guiding the read beam onto any of the data recording surfaces, a wavelength $\lambda$ of the read beam, an equivalent refractive index $n$ between each of the data recording surfaces, and a number $i$ of the laminated data recording surfaces satisfies the following relation:

$$1.4n\lambda/(NA)^2 \leq t \leq 7.5n^3\lambda/\{(n-1)(NA)^4(i-1)\}$$

With the multi-layered recording disk according to the present invention, against a reproduction level obtained when a read beam is on focus to one of data recording surfaces, a reproduction level obtained when a read beam is defocusing to other one of the data recording surfaces becomes $1/N$ ($N$ is a real number larger than 1), the distance $t$ between each of the data recording surfaces, numerical aperture NA of an objective lens guiding the read beam to any of the data recording surfaces, a wavelength $\lambda$ of the read beam, an equivalent refractive index $n$ between each of the data recording surfaces, and a number $i$ of laminated data recording surfaces satisfy the following relation:

$$1.4n\lambda/(NA)^2 \leq t \leq 7.5n^3\lambda/\{(n-1)(NA)^4(i-1)\}$$

and for this reason, so that the defocus aberration more than a specified value and a spherical aberration less than a specified value can be maintained.

BRIEF DESCRIPTION OF THE DRAWINGS

FIGS. 2A to 2G are cross-sectional views each illustrating a disk in each process for explanation of a method of manufacturing an optical disk shown in FIG. 1;

FIG. 19 is a cross-sectional view as well as an appearance view of a multi-layered recording disk having a liquid crystal layer according to an embodiment of the present invention;

FIG. 22 is a simulated view illustrating an example of recording state of TOC data in the multi-layered recording disk according to the present invention;

FIG. 23 is a simulated view illustrating another example of recording state of TOC data in the multi-layered recording disk according to the present invention.

DETAILED DESCRIPTION OF THE EMBODIMENTS

Description is made hereinafter for the present invention with reference to the related drawings.

Figure 1:
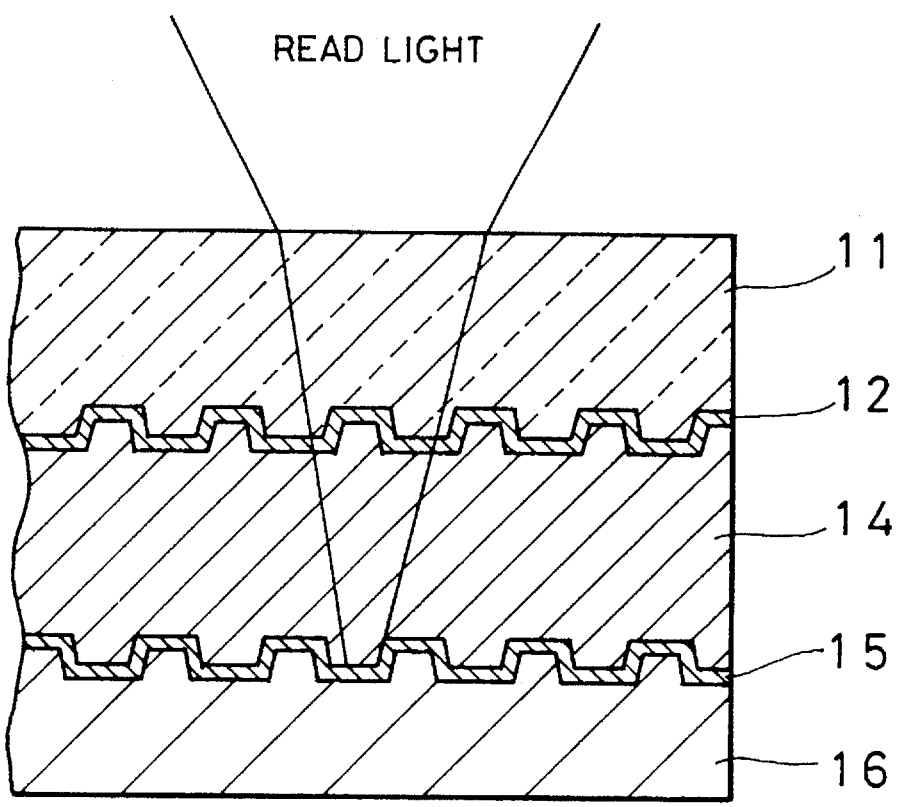
FIG. 1 is a cross-sectional view illustrating structure of a ROM type optical disk having two light reflection layers each functioning as a data recording layer in an embodiment of the present invention.

A ROM type optical disk having two light reflecting layers as data recording layers as shown in FIG. 1 are manufactured as described below.

At first, as shown in FIG. 2A, a transparent substrate 11 carrying a first recording pit P1 is prepared. The transparent substrate 11 is obtained by means of injection-molding of transparent resins such as PMMA (polymethaacrylate), or PC (Polycarbonate) using as a molding die a nickel stamper (not shown) with a first recording pit P1 arrayed in a screw or coaxial formed on the surface thereof. By means of injection molding, arrayed pits on the nickel stamper are transcribed as embossed pits, namely first pits P1 onto the substrate 11. As an alternative method, the transparent substrate 11 may be manufactured by etching a glass substrate to form embossed pits thereon.

Then, as shown in FIG. 2B, silicon (si), aluminium (Al), and other various materials as described later are deposited on the surface with pits P1 carried thereon by using a vacuum deposition unit to form a light reflecting layer 12. A first reflecting layer 12 is formed on the transparent substrate 11 as described above.

Then, a transparent stamper 13 is prepared, and is mounted on a transcription device. The transparent stamper 13 is made from glass or plastics which allows transmission of a light having a wavelength band required for curing the radioactive ray curing type resins (ultraviolet curing type resins) 14 applied in the next process. Arrayed on a surface of the transparent stamper are second recording pits in a screw or concentric form, and as shown in FIG. 2C, the transparent stamper 13 is set on the transcription device with the pit surface facing upward.

Next, as shown in FIG. 2C, the liquid phase radioactive ray curing type resins 14 is supplied onto the pit surface of the transparent stamper 13.

Then, the transparent substrate 11 is mounted on the pit surface of the transparent stamper 13 via the liquid phase radioactive ray curing type resins 14 with the first reflecting layer 12 facing downward. Thus, the radioactive ray curing type resins 14 is maintained between the first reflecting layer 12 and the transparent stamper 13 (Refer to FIG. 2D).

Then, in the state as shown in FIG. 2D, a radioactive ray is irradiated from the side of the transparent stamper 13, namely from the bottom side in the figure to cure the radioactive curing type resins 14 on the first reflecting layer 12. Thus, the arrayed pits on the transparent stamper 13 are transcribed as second pits P2 onto to the carrying cured radioactive ray curing type resins 14.

Then, as shown in FIG. 2E, after the radioactive ray curing type resins has been cured, the transparent stamper 13 is separated from the layer of radioactive curing type resins 14. The resin layer 14 as described above can be formed with a thickness of tens of 10 μm. Also other materials may be used even if the materials are not ultraviolet ray curing resins on the condition that the materials can form a similar layer.

Then, as shown in FIG. 2F, silicon, aluminium or other various materials described later are deposited on the surface of the substrate 11 with embossed pits of the radioactive ray curing type resins 14, namely pits P2 carried thereon, by using a vacuum deposition unit to form a light reflecting layer 15. Thus, the second reflecting layer 15 is laminated and formed on the radioactive ray curing resins 14.

Then, as shown in FIG. 2G, a protecting layer 16 made from the radioactive ray curing type resins for protecting the second reflecting layer 15 is laminated, thus an optical disk having the first and second reflecting layers 12, 15 respectively being obtained.

Other protecting layer allowing transmission of light may be provided between the reflecting layer 12 (or 15) and the transparent resin layer 14, or between the reflecting layer 15 and the protecting layer 16. Also from the step shown in FIG. 2F, like in the steps shown in FIGS. 2C, 2D, and 2E, 3 or more reflecting layers (recording surface) can be formed by repeatedly using transparent stampers, radioactive ray curing type resins and light reflecting material.

Figure 3:
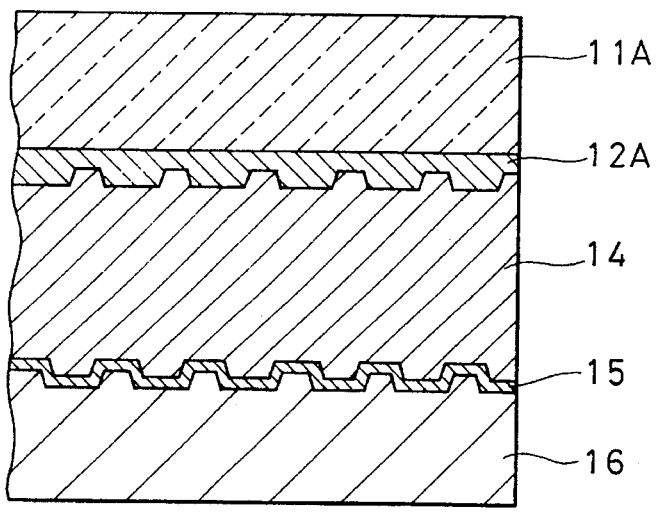
FIG. 3 is a cross-sectional view illustrating a structure of a ROM type optical disk having a structure equivalent to that of the optical disk shown in FIG. 1.

In the manufacturing method as described above, embossed pits are provided on a transparent substrate to form first pits, but as shown in FIG. 3, the embossed pits may be provided on a thin 2P layer (ultraviolet ray curing resin layer) 14 with a thickness of around 10 μm by using a flat glass substrate 11A. In this case, an interface between the reflecting layer 12A and the resin layers 14 becomes a first data recording surface.

In the disk as described above, the more laminated data recording layers, the higher a recording density in the disk, but in the description provided below, required matters concerning the optical disk according to the present invention are described with reference to a ROM type optical disk having two data recording surfaces.

Assumed in the following description is a case where, as shown in FIG. 1, a read light for detecting a pit as recorded data is irradiated from an external surface side of the transparent substrate 11 to a data recording surface, and recorded data in the reflecting layer 15, namely in a second data recording surface is read. Furthermore each of the transparent substrate 11, first light reflecting layer 12, transparent resin layer 14, and second light reflecting layer 15 has a different refractive index respectively, but herein it is assumed that all of them have the same refractive index n for simplifying the description.

The read light is focused onto either a first or a second data recording surface via an objective lens to read recorded data. For instance, a red semiconductor laser is used as a read light source, and the laser beam is focused via an objective lens onto a beam spot with a size of around 1 μm. To focus the read light on the second data recording surface, for instance, once the objective lens is fully moved away from the disk, and then gradually moved toward the disk. In this operation as described above, a focus error signal (The focus error detecting system as described above is well known, but is not described in detail therein)-shows an S-shaped curve corresponding a change amount of a distance between the object lend and the disk on each of the surface 11, first data recording surface, and second data recording surface of the substrate. For this reason, the read light can be focused on the second data recording surface by executing in-focus of the focus servo at a third S-shaped curve from the beginning of the focusing operation.

Figure 5:
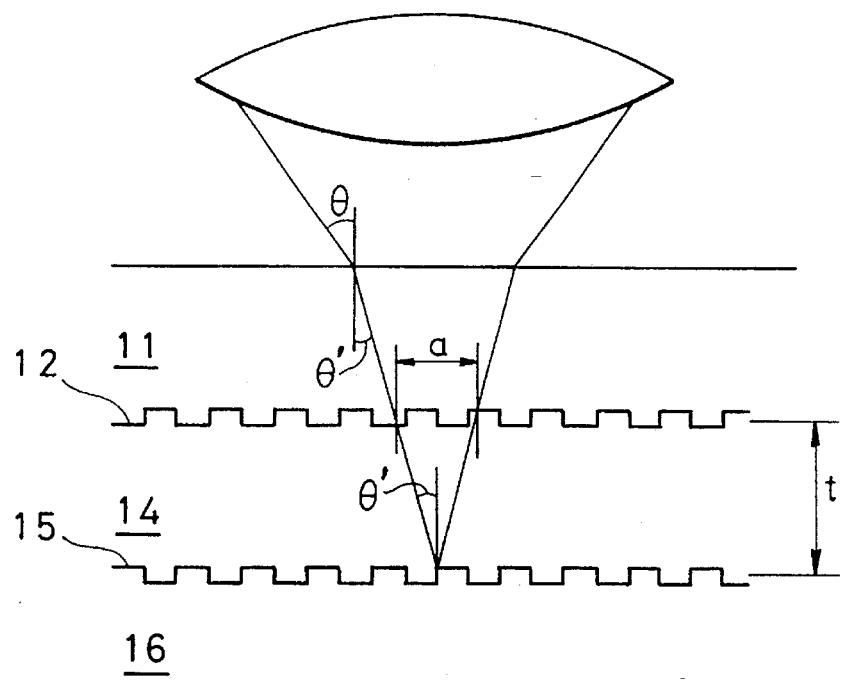
FIG. 5 is a geometrical view showing a size of a light beam on a first data recording surface when a light beam is focusing onto a second data recording surface in the optical disk shown in FIG. 1 and FIG. 3.

It should be noted for reference that a size a of a read light (laser light beam) spot on the first data recording surface when the read light is focusing on the second data recording surface can be obtained by using a geometrical simulation diagram as shown in FIG. 5. As shown from FIG. 6, the size a is the same as a spot size of a light beam on the second data recording surface when the read light is focusing on the first data recording surface.

The relation between the beam spot diameter a and a distance t between the first and second data recording surfaces is as follows:

$$2t \cdot \tan\theta' = a \quad (1)$$

On the other hand, from the Snell's law, the following relation is provided:

$$\sin\theta/\sin\theta' = NA/\sin\theta' = 1/n \quad (2)$$

It should be noted that n is an equivalent refractive index for a material between the first and second data recording surfaces; namely the transparent resin layer 14 (If there are a plurality of layers between the first and second data recording surfaces, t indicates a total thickness between these data recording surfaces, while n indicates an equivalent refractive index when the plurality of layers are substituted by an optically single layer.)

Figure 6:
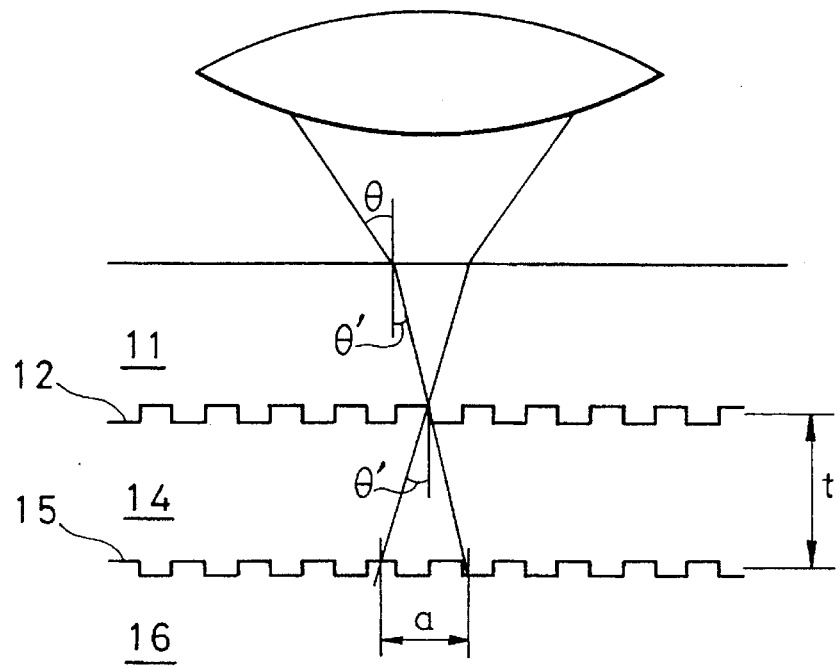
FIG. 6 is a geometrical view showing a size of a light beam on the second data recording surface when the light beam is focusing onto the first data recording surface in the optical disk shown in FIG. 1 and FIG. 3.
Figure 7:
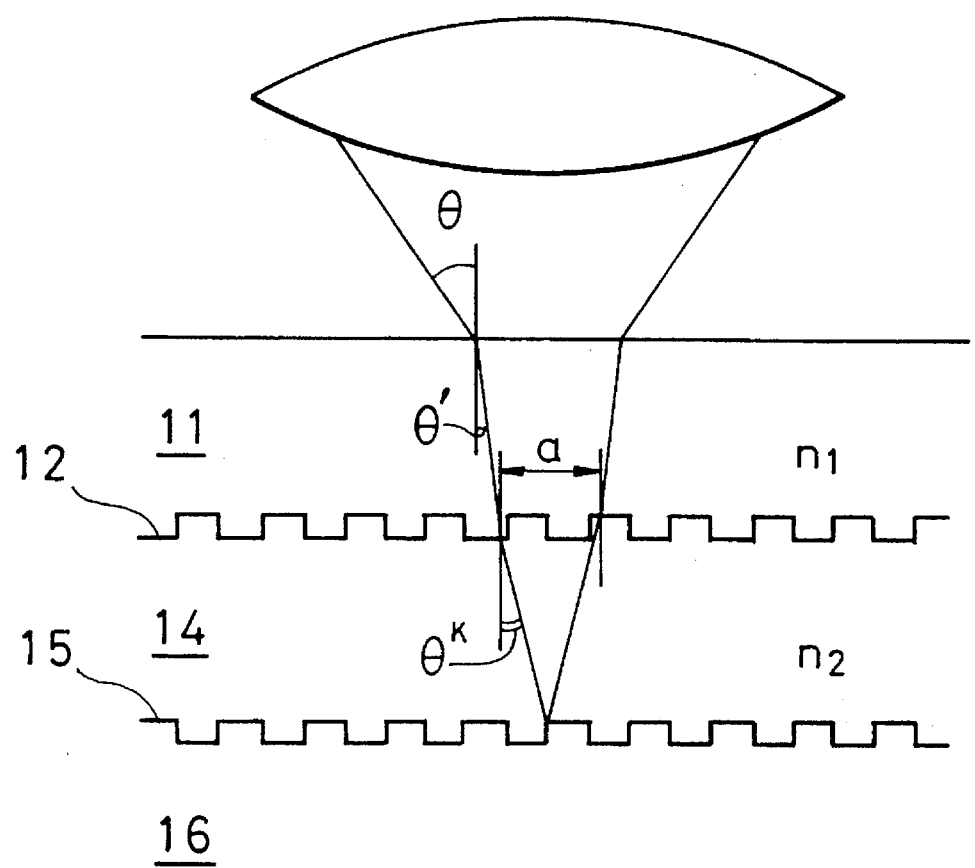
FIG. 7 is a geometrical view showing a size of a light beam in the first data recording surface when the light beam is focusing on the second data recording surface in the optical disk shown in FIG. 1 and FIG. 3 when a refractive index between a transparent substrate and a first data recording surface is not equal to that between the first data recording surface and a second data recording surface.

It should be noted that, although it was assumed in FIG. 5 and FIG. 6 that a refractive index of the transparent substrate 11 and that of a material between the first and second data recording surfaces are identical, as understood from FIG. 7, the following relations exist:

$$\sin\theta/\sin\theta' = 1/n_1 \quad (3)$$

$$\sin\theta'/\sin\theta_1 = n_1/n_2 \quad (4),$$

and the following relation is obtained:

$$\sin\theta/\sin\theta'' = 1/n_2 \quad (5)$$

so that a refractive index of the transparent substrate 11 should not always be the same as that of the material between the first and second data recording surfaces.

From the expression (2), the following relation is obtained:

$$\sin\theta' = NA \times n \quad (6)$$

so that the following expression is established:

$$\theta' = \sin-1(NA \times n) \quad (7)$$

By substituting the expression (7) into the expression (1), the following expression is obtained:

$$a = 2t \times \tan\{\sin-1(NA \times n)\} \quad (8)$$

Main features of the present invention are that, although, when a signal is read by focusing a read light onto a data recording layer, other data recording layers are set in the defocus state, a distance between the data recording layers and a signal band are set from a relation between the read characteristics (MTF characteristics) of each defocus state and a distance between data recording layers so that read elements of recording signals in other data recording layers will not generate noise (Matter 1); that signals are recorded in each recording surface according to a system in which low area elements are suppressed, assuming the matter 1 above as a precondition and taking into considerations the fact that a reproduction level rapidly drops in a high band area when defocusing (Matter 2); that a refractive index of a data recording surface closer to a side where a read light comes in is set at a smaller value than that of a data recording surface further from the incident side taking into considerations a degree of modulation of a read signal in each data recording surface (Matter 3); that a reflected light band on each data recording surface is displaced from each other to further improve the S/N ratio (Matter 4); that a material showing a larger reflection factor only when two types of light each having a different wavelength are irradiated to a data recording surface closer to a side where a read light comes in taking into considerations the easiness in selection of materials is employed (Matter 5); that, when a data recording surface closer to a side where a read light comes in with a liquid crystal layer provided between the data recording surfaces is read, incidence of the read light to other data recording surface is shut off to improve the S/N ratio without depending on a quality of material for a light reflecting layer (Matter 6); that a spiral direction of a recording track in each recording surface is decided taking into considerations smooth execution of read operations including focus control and tracking control in a reproduction system (Matter 7); and that TOC data for all data recording surfaces are recorded taking into considerations random access in a reproduction system (Matter 8). Furthermore the present invention a data recording layer is formed with a light reflecting material generating a return light having a quantity of light or a wavelength corresponding to an energy density of a read light because an energy density of the read light differs for each data recording layer (Matter 9).

Next description is made for each of the matters above,

At first description is made for Matter 1 and Matter 2.

Figure 8:
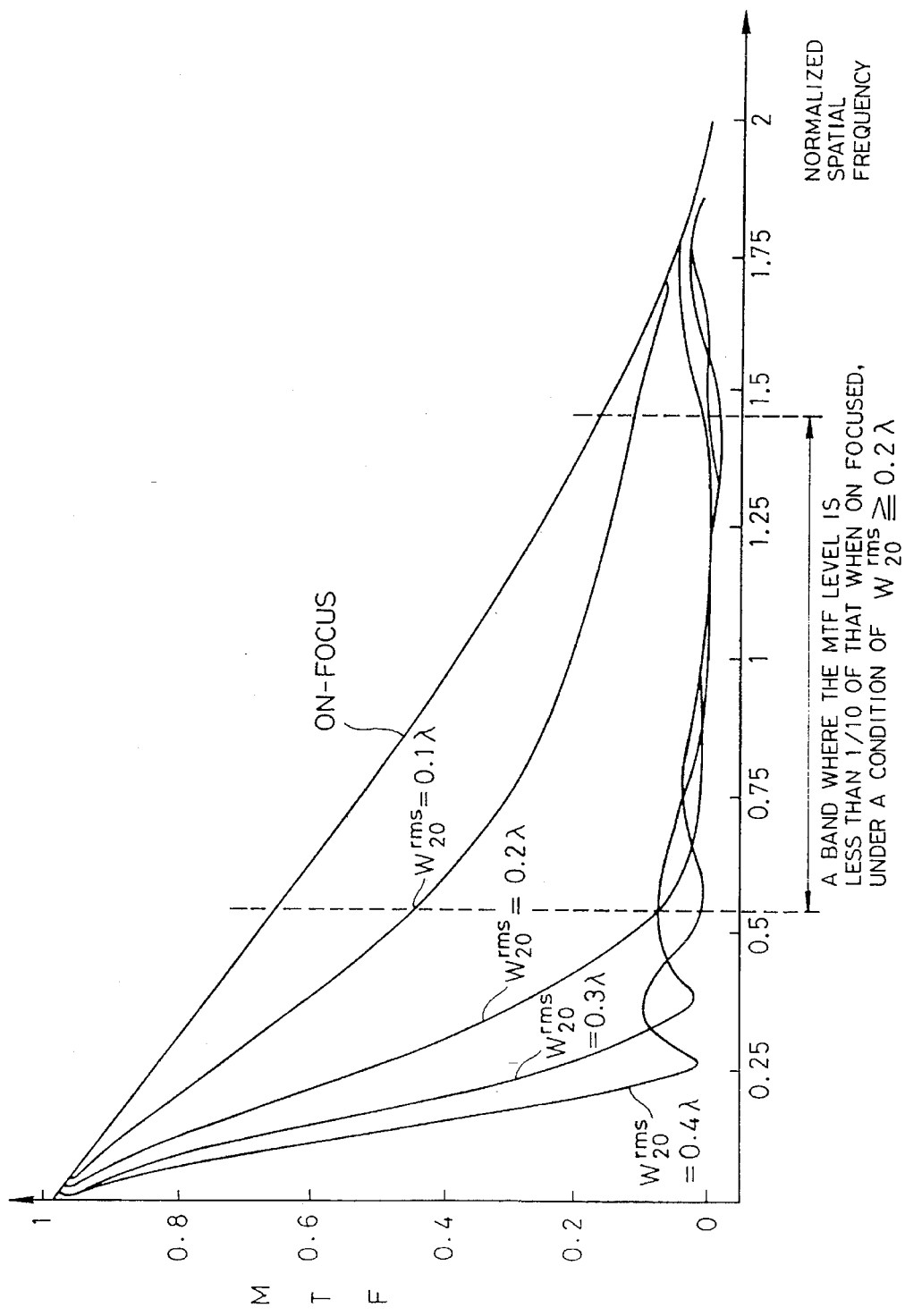
FIG. 8 is a graph showing the MTF characteristics of defocus and on-focus states of a light beam in the optical disk shown in FIG. 1 and FIG. 3.

As shown in FIG. 5 and FIG. 6, when a read light is irradiated being focused on one of two laminated data recording surfaces, the read light reads recorded data in the other data recording surface in a defocused state (namely all the reflected light components of a read light include reflected elements in a defocused state corresponding to recorded data in the other data recording surface. The MTF characteristics in the defocused state and the MTC characteristics in the on-focus state are shown in FIG. 8. The MTF characteristics described above are for a disk having the light transfer characteristics into which a read light is introduced and which reflects the incident light and based on the OTF characteristics according to a theory for image formation.

In FIG. 8, a read signal (reflected light) for a data recording surface on which a read light is focused to read out recorded data stored therein follows a curve (bold line) for on-focus, while a read signal (reflected light) for the other data recording surface which is not an object for reading follows a curve (thin line) in a defocused state.

The characteristics curve expressed by the thin line shows that, even if defocusing is performed with a defocus aberration $W_{20}^{rms}=0.1\lambda, 0.2\lambda, 0.3\lambda...$, a reproduction level (level of a reflected light) is not so much stabilized in a low spatial frequency area, and is elevated a little in a high spatial frequency area. As the reproduction level when defocusing is for data recording surfaces (data recording surfaces in a defocused state) other than a data recording surface to be read (a data recording surface in an on-focus state), the smaller the reproduction level during defocusing as compared to a reproduction level during on-focusing, the better.

Figure 9:
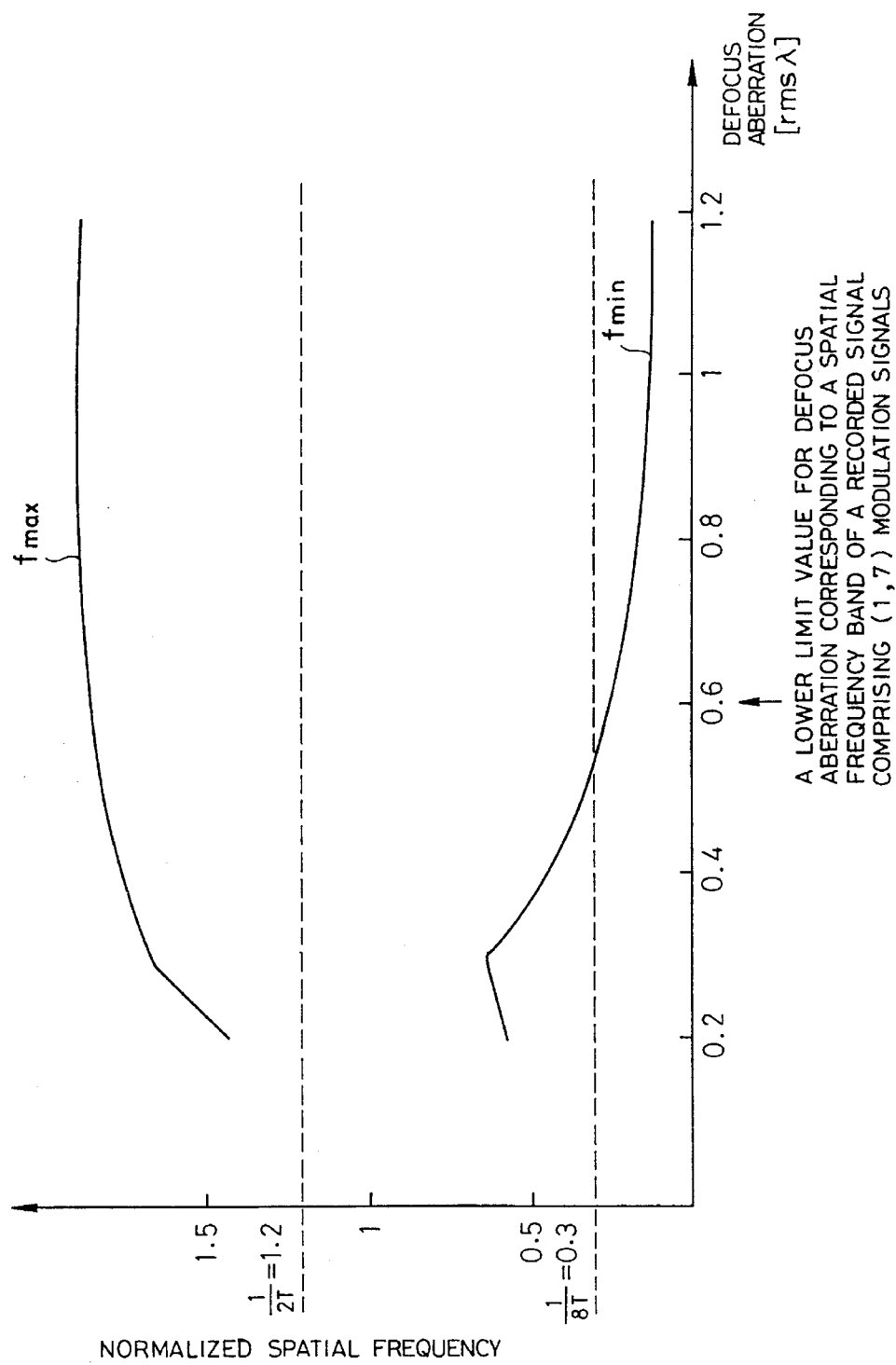
FIG. 9 is a graph showing a maximum value and a minimum value of a normalized spacial frequency to a defocus aberration in a case where a reproduction level when defocusing is less than $1/N$ of a reproduction level when on-focusing.

If a frequency band of normalized spatial frequency, namely recording signals is limited according to a defocus aberration rate to suppress a reproduction level during defocusing less than 1/10 of a reproduction level during on-focusing, the graph as shown in FIG. 9 is obtained. Namely signals (pits) have only to be recorded on a data recording surface limiting a frequency band into a band having a normalized spatial frequency indicated by the curve $f_{max}$ in the graph as an upper limit and a normalized spatial frequency indicated by the curve $f_{min}$ as a lower limit. To suppress a reproduction level during defocusing to less than 1/10 of a reproduction level during on-focusing for all of 0.2 to 1.2 rms $\lambda$ in defocus aberration, it is required that the normalized spatial frequency band is from 0.7 to 1.7.

This type of operation for limiting a frequency band as described above can be realized, for instance, by forming recording signals with run length limited (RLL) code for suppressing DC elements to realize a limited band as described above, by shaping a recording signal band using a partial response for limiting the transfer characteristics, or by forming recording signals by means of executing carrier modulation such as FM, PM, QAM, QPSK, or VSB.

Thus, by setting the defocus aberration to 0.2 rms$\lambda$ or more, a band for available recording signals can be set.

Then, upper and lower limits for a distance between the first data recording layer and second data recording layer when the defocus aberration is set to 0.2 rms $\lambda$ or more are obtained.

* Lower limit value

Reflected light elements due to defocused data recording surfaces in a read signal substantially follow OTF when defocused according to a distance between the first and second data recording layers from the on-focused recording surface (Refer to FIG. 5 and FIG. 6). The defocus aberration $W_{20}^{rms}$ then is as follows:

$$(W_{20}^{rms} = \{n/\sqrt{12}\}[1-\sqrt{1-(NA/n)^2}\,]t \qquad (9)$$

$$\approx (1/\sqrt{48})(NA^2/n)t$$

$$\therefore t = W_{20}^{rms}\sqrt{48}\ n/NA^2 \qquad (10)$$

To suppress reflected light elements for defocus data recording surfaces to substantially below the reflected light elements for the on-focus data recording surface, at least $W_{20}^{rms}$ above must be larger than 0.2 $\lambda$ ($W_{20}^{rms}>0.2\lambda$), so that the following relations are provided:

$$0.2\lambda < (1/\sqrt{48})(NA^2/n)t \qquad (11)$$

$$t > 0.2\lambda\sqrt{48}\ n/NA^2 \qquad (12)$$

$$\therefore t > 1.39\ n\lambda/NA^2 \qquad (13)$$

Assuming that n is equal to 1.5

$$t > 2\ \lambda/NA^2 \qquad (14)$$

For instance, if a recording signal is (1,7) modulation code generated by 0,1 coding in which 7 or more zeroes (0) do not appear, the shortest inversion interval 2T (T: sampling cycle) is, for instance, 1.2 in terms of normalized spatial frequency, and the longest inversion interval 8T is ¼ thereof, namely 0.3, it can be understood, from FIG. 9, that, if the defocus aberration is 0.6 rms $\lambda$ or more, the requirement for a reproduction level during defocusing to be less than 1/10 of a reproduction level during on-focus is satisfied in a normalized spatial frequency band from 0.3 to 1.2. When $W_{20}^{rms}$ is equal to 0.6 $\lambda$, n to 1.5, $\lambda$ to 680 nm, and NA to 0.55, from the above expression (10), it can be understood that a thickness t between the first and second data recording layers has only to be 14 μm or more.

Also when $W_{20}^{rms}$ is equal to 0.2 $\lambda$, n to 1.5, $\lambda$ to 680 nm, and NA to 0.55, from the expression (10) above, a lower limit value of 4.67 μm is obtained for a thickness t between the first and second data recording layers, and when taking into considerations a capture range of in-focus in a focus servo, it is desirable that the thickness t is set to 10 μm or more.

Figure 4:
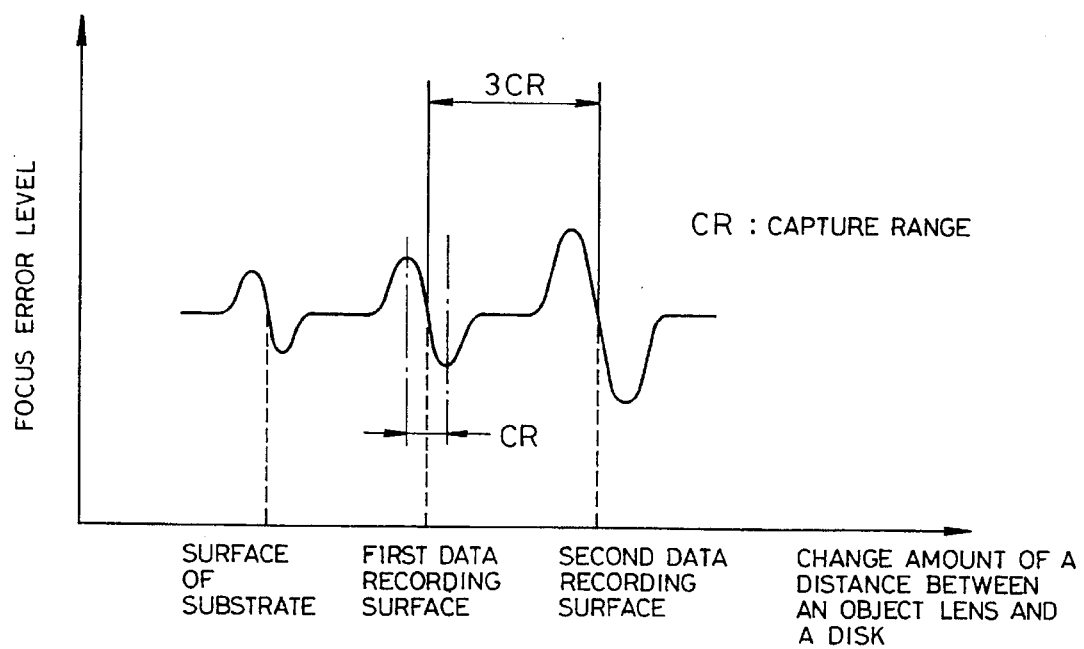
FIG. 4 is a graph showing a focus error level against a change amount of a distance between an objective lens and a disk in a focusing operation to the optical disk shown in FIG. 1 and FIG. 3.

In other words, an error signal is included in a focus error signal due to the reflected light from a defocus data recording surface, and to suppress the error signal to a substantially low level, 3 times or more of the capture range CR as shown in FIG. 4 is required. As generally the capture range is required to be 3 to 4 μm or more, the value t is as shown below:

$$\therefore t \geq 10 \ \mu m \quad (15)$$

It is desirable to employ either larger one of a lower limit value obtained through the expression (15) above, or a lower limit value decided according to the expression (10).

* Upper limit value

If a distance t between data recording surfaces is too large, the spherical aberration increases and it becomes harder to read recording signals, so that an upper limit value for the thickness t is obtained.

Figures 10, 11:
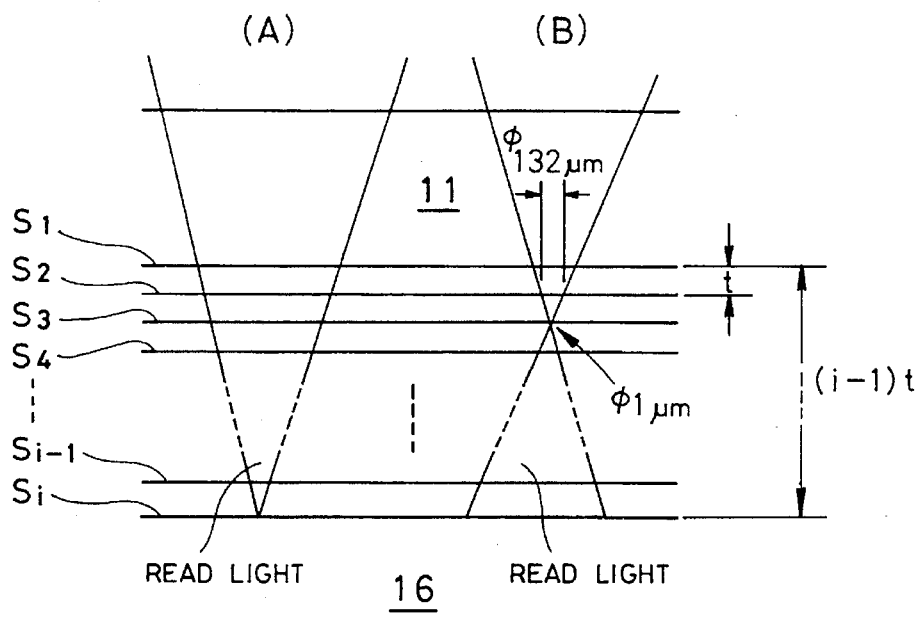
FIG. 10 is a simplified cross-sectional view of a disk having $i$ pieces of data recording surfaces for explanation of an operation for guiding an upper limit value of a distance between data recording surfaces in an optical disk according to the present invention as well as for explanation of a difference in light energy density of a read light in each data recording surface.
FIG. 11 is a chart illustrating an example of an operation for computing upper and lower limit values of a distance between data recording surfaces in the optical disk according to the present invention.

Namely in a disk having i (i: an integer of 2 or more) pieces of data recording surfaces as shown in FIG. 10, the thickness against light when reading the first data recording surface $S_1$ is different by $(i-1)$ t from that when reading the i-th data recording surface Si (t: a distance between data recording surfaces, a distance between each data recording surface is identical). In this case, the spherical aberration is generated.

When reading the first data recording surface $S_1$ or the i-th data recording surface Si by using a lens with the spherical aberration corrected to an intermediate point between the first data recording surface Si and the i-th data recording surface $S_1$, the spherical aberration $W_{40}^{rms}$ generated in each of the i pieces of recording layers is expressed as follows: Generally it is empirically known that, when reproducing $$W_{40}^{rms} \approx \{1/(48\sqrt{5})\}\{(n^2-1)/n^3\}NA^4\{(i-1)t/2\} \quad (16)$$

recorded data from an optical disk, it is necessary to set the wave front aberration to less than the maréchal criterion (0.07 rms λ). As for the wave front aberration, it is necessary to take into considerations also aberration in an objective lens or that due to inclination of a disk, so that an allowance of $W_{40}^{rms}$ is required to set to ½ or less of around 0.07 rms λ, so that the following expressions are obtained:

$$0.07\lambda/2 \geq \{1/(48\sqrt{5})\}\{(n^2-1)/n^3\}NA^4\{(i-1)t/2\} \quad (17)$$

$$\therefore t \leq 7.5 \ n^3 \ \lambda/\{(n^2-1)NA^4(i-1)\} \quad (18)$$

Now assuming that n≈1.5

$$t \leq (20/NA^4)\{\lambda/(i-1)\} \quad (19)$$

and, furthermore if it is assumed that i is equal to 2 (i=2), $$t \leq 20\lambda/NA^4 \quad (20)$$

For this reason, from the expressions (14) and (20), a distance t between data recording surfaces in a case where n is equal to 1.5 (n=1.5) and i to 2 (i=2), the following relation is obtained:

$$2\lambda/NA^4 \leq t \leq 20 \ \lambda/NA^4 \quad (21)$$

Depending on the expression above, the lower and upper limit values of t and NA are changed according to practical values easily employable, and the limit values are shown in a table in FIG. 11. Furthermore it is desirable to add the expression (15) to the condition to satisfy the following expression:

$$10 \ \mu m \leq t \leq 20\lambda/NA^4 \quad (22)$$

To summarize the Matter 1, as indicated by the expressions (13) and (18), by manufacturing a multi-layered disk satisfying the following relations:

$$1.39n\lambda/(NA)^2 \leq t \leq 7.5n^3\lambda/\{(n^2-1)(NA)^4(i-1)\} \quad (I)$$

it is possible to read recorded data in a focus data recording surface without being affected by defocus data recording surfaces. Furthermore preferably, in addition to the expression above, by satisfying the following expression:

$$10 \ \mu m \leq t \leq 7.5 \ n^3\lambda/\{(n^2-1)(NA)^4(i-1)\} \quad (II)$$

it becomes possible to prevent generation of a focus error signal due to a capture range indicating an allowable width for a pulling-in operation in focus servo.

It should be noted that each data recording surface is not required to have a different reflected light band respectively for achieving the Matters 1 and 2.

Next description is made for the Matter 3 above.

This applies to a case when a film, a refractive index or a transmission factor of which does not change according to a wavelength of an incident read light, is used for a reflection film for each data recording surface.

For instance, in FIG. 1, when reading the second data recording surface (reflecting layer 15), a light having transmitted through the first data recording surface (recording surface 12) is reflected on the second data recording surface, the reflected light furthermore passes through the first data recording surface, the light returning to the light source side as a reflected light from the disk is received, and a read signal according to a quantity of received light is obtained. On the condition that each reflecting layer does not absorb light at all, and assuming that a reflection factor of the first data recording surface is $\alpha$, the transmission factor is $(1-\alpha)$, a reflection factor of the second data recording surface is $\beta$, the transmission factor thereof is $(1-\beta)$, and a quantity of read light is P, and furthermore assuming that a light having passed through the second data recording surface basically does not return as a reflected light from a disk and a modulation degree by a pit in each data recording surface is k, the modulation degree M1 of a read signal obtained when the first data recording surface is read is expressed by the following expression:

$$\begin{aligned} M1 &= P\alpha k/\{\alpha + (1-\alpha)^2\beta)\} \quad (23) \\ &= P\alpha k/(\alpha + \beta - 2\alpha\beta + \alpha^2\beta) \\ &\approx P\alpha k/(\alpha + \beta) \end{aligned}$$

while the modulation degree M2 of a read signal obtained when the second data recording surface is read is expressed by the following expression:

$$\begin{aligned} M2 &= P(1-\alpha)^2\beta k/\{\alpha + (1-\alpha)^2\beta\} \quad (24) \\ &\approx P(1-\alpha)^2\beta k/(\alpha + \beta) \end{aligned}$$

Both $\alpha$ and $\beta$ are a number smaller than 1, so that $(1-\alpha)^2$ is a square of a number smaller than 1. For this reason, in order that the expression (23) and expression (24) give the same value respectively, $\beta$ must be substantially larger than $\alpha$. Namely, a reflection factor of a data recording factor further when viewed from the side where the read light comes in must be set to a larger value than a reflection factor of the closer data recording surface.

Figure 12:
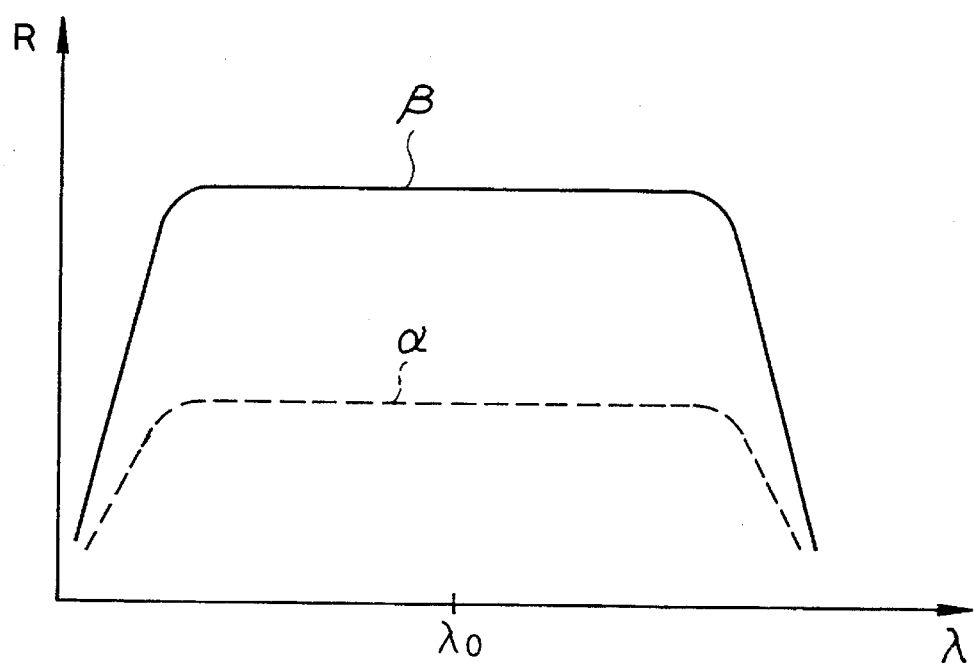
FIG. 12 is a graph showing the refractive index characteristics of one data recording surface closer to a side where a read beam comes in and other data recording surface.

For instance, assuming that $\alpha$ is 0.36 and $\beta$ is 0.9, $$M1 \approx 0.36 \ Pk/1.26 \quad (25)$$

$$M2 \approx 0.37 \ Pk/1.26 \quad (26)$$

and thus M1 and M2 are almost identical. The reflection factor characteristics of each data recording surface in this case is shown in FIG. 12, and herein the horizontal axis λ indicates a wavelength of a read light, while the vertical axis k indicates a reflection factor for the read light.

It should be noted that, also in the Matter 3, each data recording surface is not required to have a different reflection light band respectively.

Next description is made for the Matter 4 above. Herein each data recording surface is required to have a different reflected light band respectively.

In the embodiment described with reference to FIG. 12 above, a requirement for a reflection film when a plurality of data recording surfaces are read using a read light source emitting a light having a single wavelength is described, but idealistically it is desired, when one data recording surface is read, that the other data recording surfaces have no color and are transparent. A state close to what was described above can be realized by using a light source emitting a light having a plurality of wavelength is used and a reflection film corresponding to each wave length is employed for each data recording layer. However, a data recording surface can not be completely transparent, so that even in this case the expression (I) or preferably the expression (II) should be satisfied.

Figure 13:
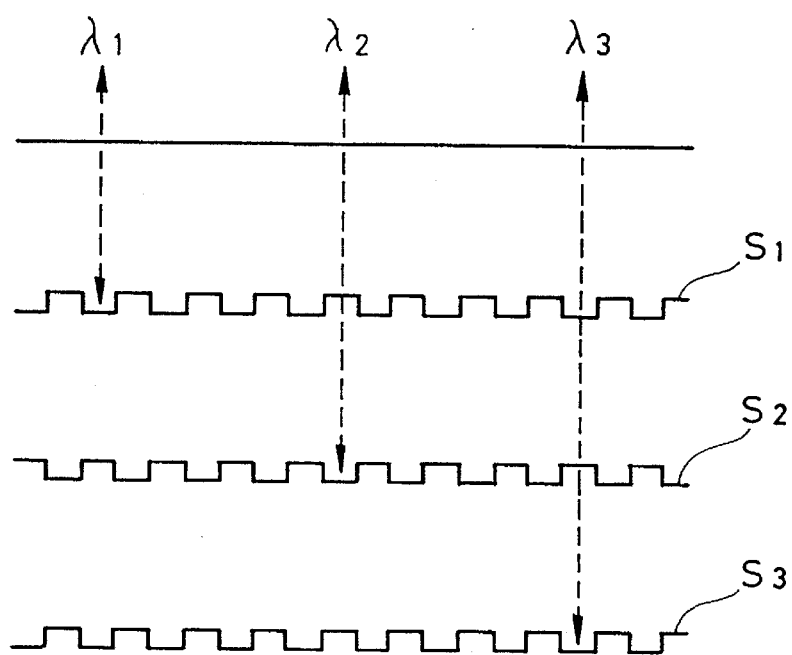
FIG. 13 is a simplified cross-sectional view of a disk illustrating an operating for reading the first and third data recording surfaces with read beams each having a different wavelength respectively.
Figure 14:
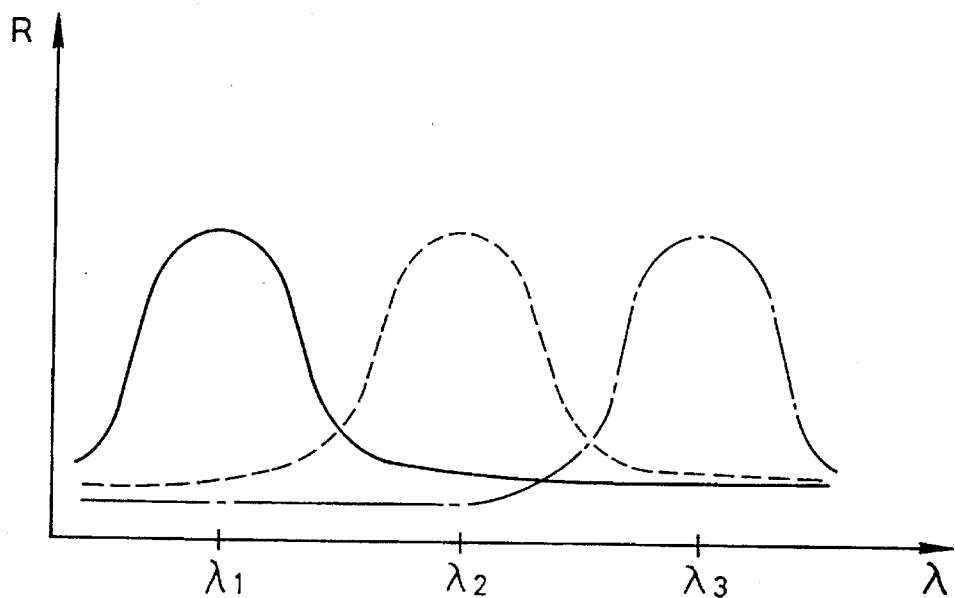
FIG. 14 is a graph showing the refractive index characteristics of each data recording surface in the optical disk shown in FIG. 13.

For this reason, on the condition that the expressions (I) or (II) is satisfied, as shown in FIG. 13, the first data recording surface $S_1$ is read by a read light having a wavelength of $\lambda_1$, the second data recording surface $S_2$ by a read light having a wavelength of $\lambda_2$, and the third data recording surface $S_3$ by a read light having a wavelength of $\lambda_3$. Namely, as shown in FIG. 14, the characteristics is set so that a reflecting film for the first data recording surface shows a large reflection factor at a wavelength of $\lambda_1$, and its reflection factor becomes lower at wavelengths of $\lambda_2$ and $\lambda_3$, and on the contrary the transmission factor thereof increases, while a reflecting film for the second data recording surface shows a larger reflection factor at a wavelength of $\lambda_2$, the reflection factor drops while the transmission factor goes up at the wavelengths of $\lambda_1$ and $\lambda_3$, and furthermore a reflecting film for the third data recording surface shows a larger reflection factor at a wavelength of $\lambda_3$, and the reflection factor drops while the transmission factor goes up at the wavelengths of $\lambda_1$ and $\lambda_2$. With the characteristics, a read signal having an excellent S/N ratio can be obtained. It should be noted that, for instance, dye materials or the like are used and a light reflecting material with selectivity for wavelength is employed for the reflecting film as described above.

Next description is made for the Matter 5 above. Herein, it is required that, of a plurality of data recording surfaces, a data recording surface closer to a side where an incident light comes into has a specified reflection factor characteristics.

The embodiment described with reference to FIG. 13 and FIG. 14 is a case where a read light has a plurality of wavelengths, but a wavelength of a read light may be limited to only one type to read recorded data changing the reflection factor characteristics of a reflecting film of a data recording surface using a light source other than that described above.

Figure 15:
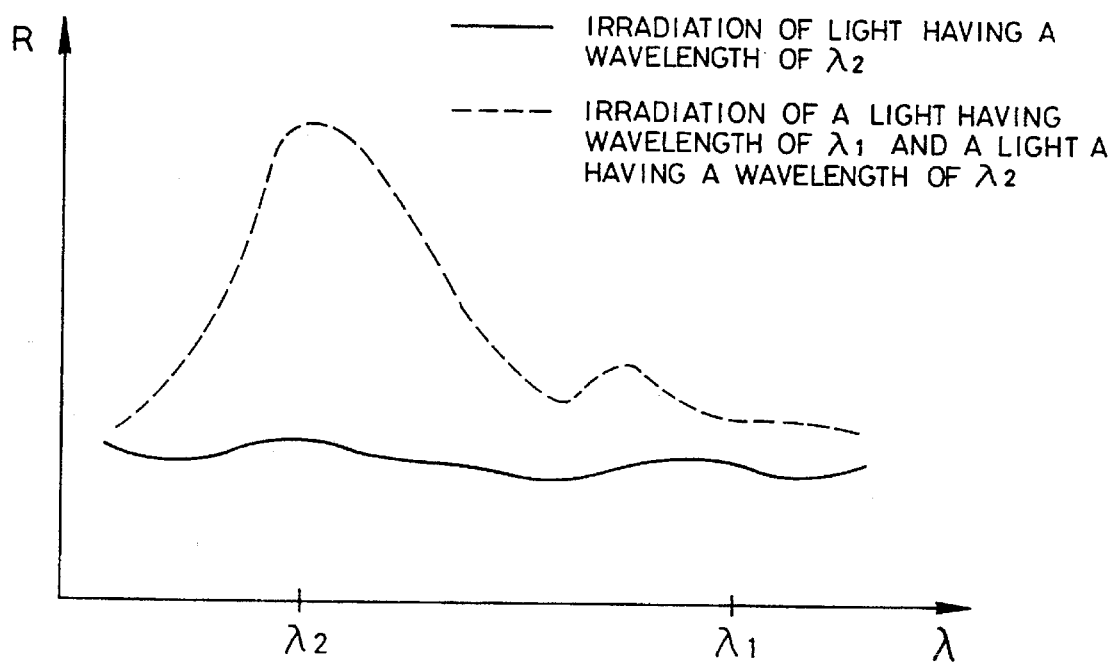
FIG. 15 is a graph illustrating the refractive index characteristics of a photochromic material.

For instance, in some types of photochromic material, as shown in FIG. 15, the reflection factor does not change for a single incident light having a wavelength of $\lambda_2$, but when, in addition to an incident light having a wavelength of $\lambda_2$, a light having a wavelength of $\lambda_1$ is irradiated, the reflection factor goes up at a wavelength of $\lambda_2$ and those around it.

Figure 16:
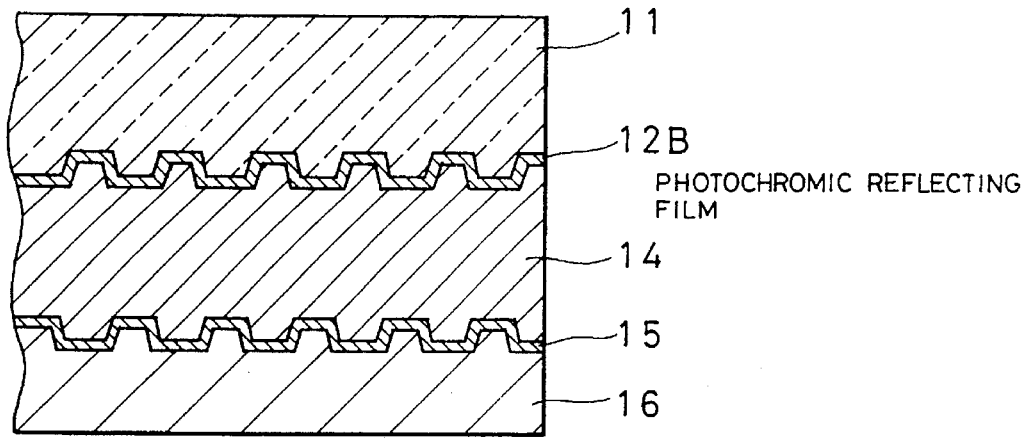
FIG. 16 is a cross-sectional view of a multi-layered recording disk according to an embodiment of the present invention.

So herein it is assumed that, as shown in FIG. 16, a reflecting film 12B for a data recording surface closer to the transparent substrate 11 is made of photochromic material. For instance, it is assumed that a light source for a read light is a red laser diode, and a disk in which, when a light from a green light source is irradiated as an additional light, the photochromic layer as a data recording surface reacts the reflection factor for a red light increases is read, is manufactured.

Figure 17:
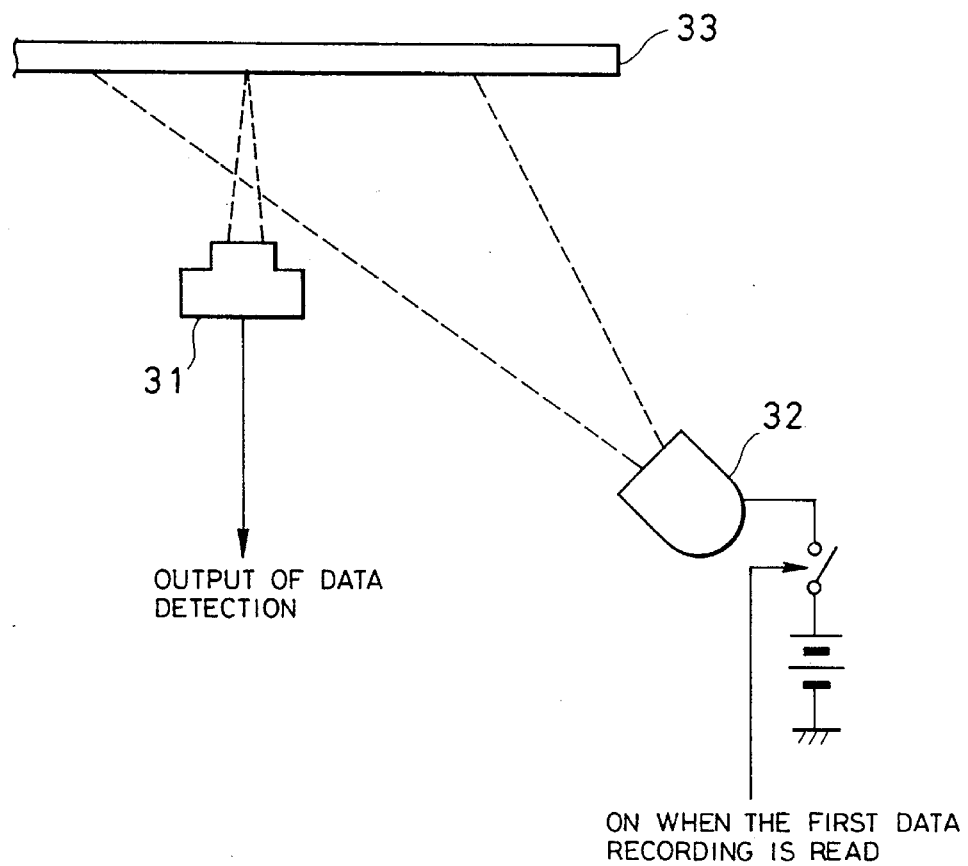
FIG. 17 is a block diagram illustrating configuration of a reproducing system according to an embodiment of the present invention for reproducing recorded data in the disk shown in FIG. 16.

As a recorded data reproducing system for the disk as described above, as shown in FIG. 17, only one unit of pick-up 31 for detecting data by means of irradiating a red laser bean read light is provided, and a lamp 32 different from this pick-up and emitting a green light is provided. The lamp 32 is lit for irradiating a light to a disk 33 manufactured as described above (at least data detecting point of the pick-up 31 and an area around the point) when the first data recording surface (12B) is read, and the green light lamp 32 is turned OFF when the second data recording surface (15) is read.

Figure 18:
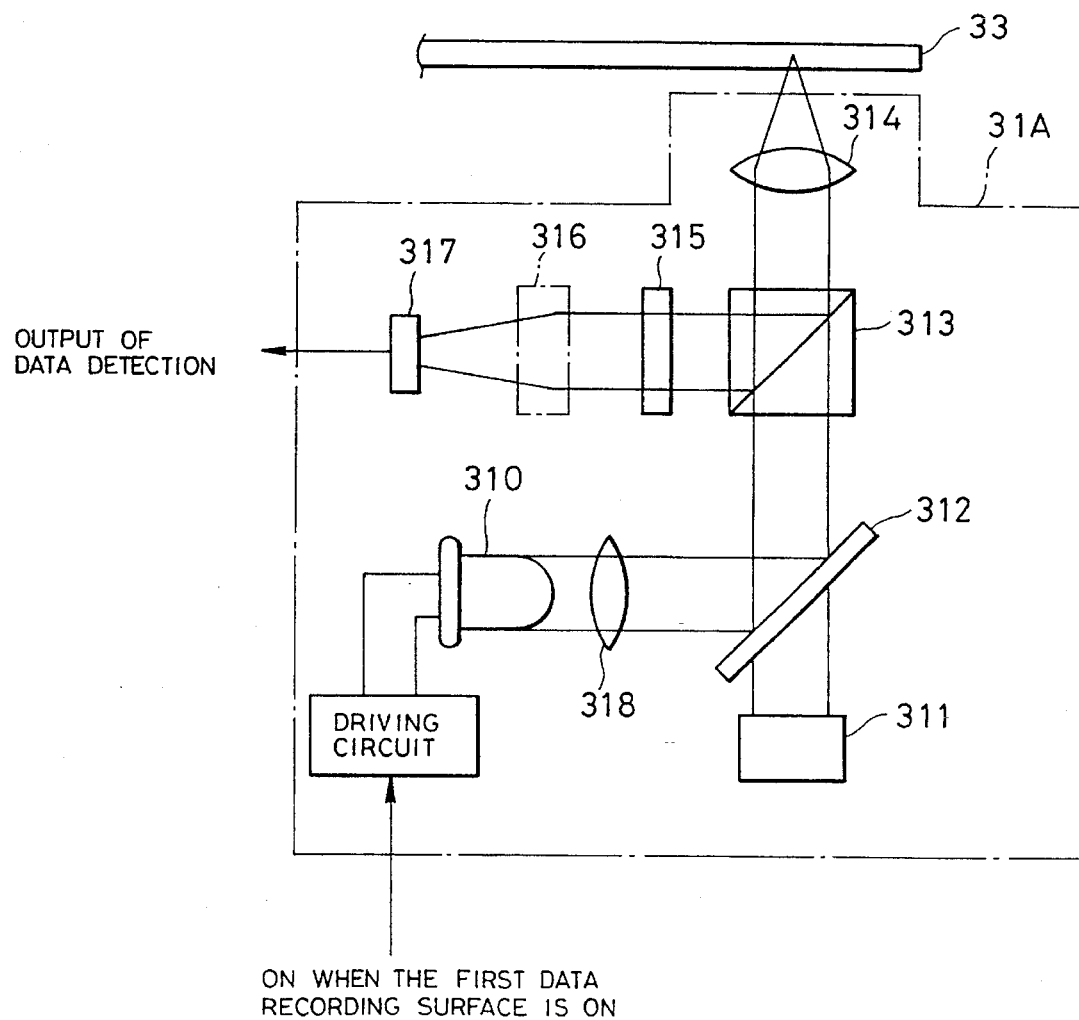
FIG. 18 is a block diagram illustrating configuration of a reproducing system according to another embodiment of the present invention for reproducing recorded data in the disk shown in FIG. 16.

Also as shown in FIG. 18, the configuration is allowable, where a green light-emitting diode 310 is provided inside the pick-up 31A, and a light outputted from this diode is synthesized with a red read light emitted from the red laser light diode 311, and the synthesized light is irradiated to the disk 33.

In FIG. 18, a light emitted from the red laser 311 for data detection passes through a green light reflecting plate 312 and goes into the disk 33 through a half mirror 313 as well as an objective lens 314. A red light reflected from the disk 33 is reflected on the half mirror 313 and is guided through a red light filter 315 and an optical system 316 into a photo detector 317. The optical system 316 as described above consists of, for instance, parallel flat plates and a lens, and the light having passed through the filter 315 is focused onto the photo detector 317. On the other hand, the light emitted from the green light emitting diode 310 as an additional light source goes through a lens 318 into the green light reflecting plate 312 and is reflected on the plate, and then goes into the disk 33 together with a red light from the laser 311 having passed through the reflecting plate 312.

When the first data recording surface is read, the green light emitting diode 310 is driven by a driving circuit to emit a light, a plurality type of light having both wavelengths for a red light and a green light are irradiated onto the disk 33, and a read operation is executed in the state for the characteristics as indicated by a dotted line in FIG. 15. When the second data recording surface is read, the green light emitting diode 310 is turned OFF, and a light having only a wavelength for a red light is irradiated to the disk 33, and a read operation is executed in the state having the characteristics as indicated by a solid line in FIG. 15 executed. For this reason, the green light diode 310 is turned ON or OFF in response to a data recording surface to be read.

Furthermore, the configuration is allowable in which a plurality of pick-ups each having the configuration as the pick-up 31A are used as a reproducing system with a high read transfer rate. For instance, 2 units of this type of pick-up are prepared, and a red light emitting laser and a green light emitting diode are driven for reading the first data recording surface with one of the pick-ups and also reading the second data recording surface with the other pick-up respectively. With this feature, the two data recording surfaces can simultaneously be read out within a unit time, so that this type of system is advantageous for treating a large quantity of data. With the configuration as described above, it is possible to change a data recording surface to be read by one of the two pick-ups.

It should be noted that, although in the above description it was assumed that a read light and an additional light were a red light and a green light, an invisible light such as an infrared light or a ultraviolet light may be used, and if required, an electromagnetic wave or X ray having different characteristics from a visible light may be used. The source for the additional light is not limited to a photodiode or a lamp, and also a laser diode may be used. It should be noted that, a light emitted from the diode 310 shown in FIG. 18 is not required to be irradiated onto a data recording surface of the disk 33 as in a case of a laser, so that it does not become an additional load to optical components such as a lens. Also it is desirable to introduce only light elements for reading recorded data onto the photo detector 317, so that a filter 315 allowing passage of only a red light is provided in the previous stage for improving the efficiency in reading. Next description is made for the Matter 6. Herein each data recording surface is not required to have a different reflect light band respectively.

In the embodiment described with reference to FIG. 15 and FIG. 18, a reflecting layer which changes the reflection factor characteristics when an additional light is irradiated in addition to a read light, but as shown in FIG. 19, a reflection factor of each data recording layer may be changed by using a liquid crystal layer held between transparent electrodes.

In FIG. 19, a transparent and conductive reflecting layer 51 is laminated as a first data recording layer on the transparent substrate 11, and the reflecting layer 51 is connected to an external surface of the disk 50 so that it is electrically communicated to a conductive ring 51r provided near the utmost external periphery. A transparent electrode layer 52 is formed on the reflecting layer 15 as well as on the transparent resin layer 14 as a second data recording layer laminated on a protecting layer 16./ Between a pair of transparent electrode layers 51 and 52, a liquid crystal layer 54 surrounded by a space section is formed. The conductive ring 52 is provided at a space and an inner side from the conductive ring 51r, and each ring is exposed to outside.

When reading and reproducing recorded data from this disk 50, the disk is rotated being contacted to an exposed surface of each ring. And, when reading the first data recording surface, a read light is introduced loading a driving voltage to darken the liquid crystal layer 54 to between a brush 55 contacting one of the conductive rings 51r and a brush 56 contacting the other ring 52r with a driving circuit 57. With this operation, incidence of a read light to the second data recording layer 15 is shut off by the darkened liquid crystal layer 54, so that the first data recording surface is read. When reading the second data recording surface, the driving circuit 57 is turned OFF and the liquid crystal layer 54 is brightened, so that the read light reaches the second data recording layer, and the second data recording surface can be read.

With the configuration as described above, when reading the first data recording surface, a read light introduced to the second data recording surface is exhausted, so that the first data recording surface can be read without generating reflected light elements not required due to recording signals in the second data recording surface, and the S/N ratio can be improved furthermore.

Next description is made for the Matter 7.

When a plurality of data recording surfaces with a single pick-up, the following points should be taken into considerations.

Figure 20:
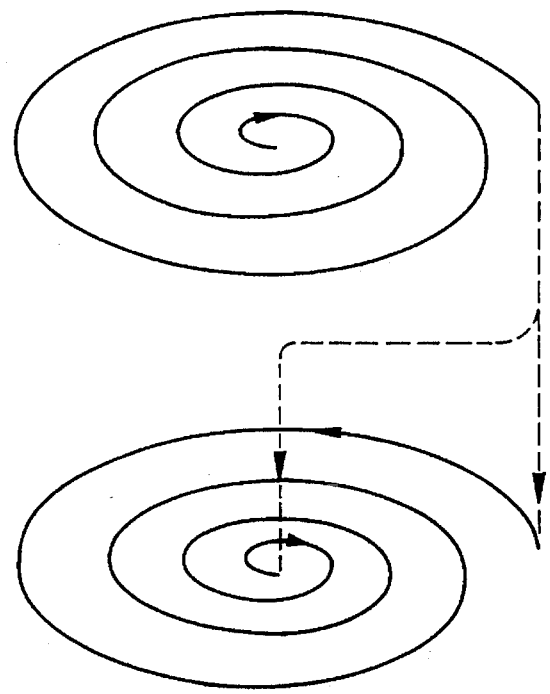
FIG. 20 is a simulated view for explanation of a problem concerning a spiral direction of a recording track in each data recording surface in a multi-layered recording disk.

Assuming that, on a data recording surface of the disk 1, signals are recorded from an inner side to an outer side, for instance, in a spiral track form, and a final signal recorded in the data recording surface is followed by a signal recorded in another data recording surface, a direction of a spiral in each data recording surface is identical, and if the rotating direction of the disk is not changed, as shown in FIG. 20, when shifting to an operation for reading another data recording surface to read out a signal subsequent to the final signal, it is necessary to return to the inner side and to again setting a focus. Also in case of CLV, rpm of a disk must be changed substantially. In contrast, after this final signal is read, the focus is reestablished as it is at the outer side, the disk is required to be rotated in the reverse direction to read the other data recording surface from the outer side.

Figure 21:
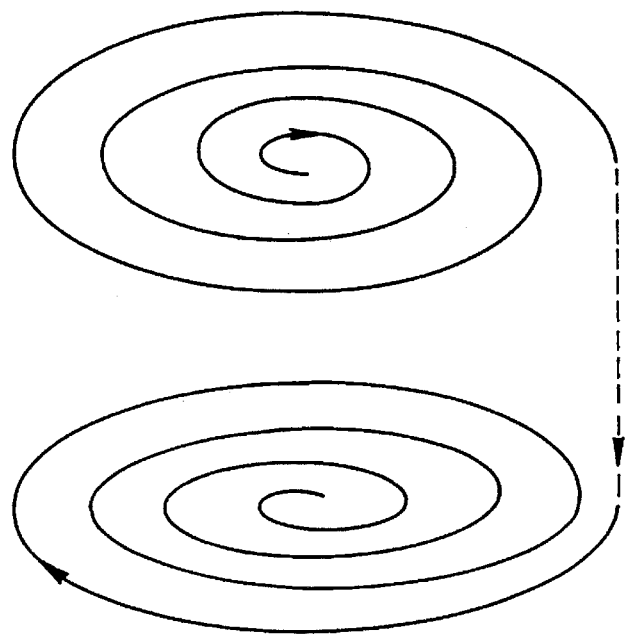
FIG. 21 is a simulated view for explanation of a spiral direction of a recording track in each data recording surface in a multi-layered recording disk according to the present invention.

When the inconvenience as described above is taken into considerations, as shown in FIG. 21, for instance, it is preferable that a spiral direction of a recording track in the first data recording surface is made contrary to that in the second data recording surface, signals in the first data recording surface are read from the inner side to the outer side, and after the final signal is read, a focus is re-established without changing a rotating direction or rpm of the disk, a read operation shifts as it is to the second data recording surface to read data from the outer side to the inner side. With this feature, smooth continuity in an operation for reading a multi-layered disk can be maintained. In a case of a disk having three data recording layers, if at least one layer has a reverse spiral, the continuity as described above can be maintained.

In a case where there are two data recording layers, when considering the easiness in establishing a focus, it is better to start reading the first data recording surface from the outer side and proceed to an inner side, and to re-establish a focus again when the final signal in the first data recording surface is read and then to start reading the second data recording surface from the inner side and proceed to the outer side. This matter can be applied not only to a spiral track, but also to a concentric track.

Next description is made for the Matter 8 above. Herein the easiness in random access to a reproduction system is taken into considerations.

One of a plurality of data recording surfaces is regarded as an initial surface, and allocation data for all recorded data in the disk (the data equivalent to TOC data as used in an ordinary CD. Called TOC data hereinafter) is recorded in a specified recording area of this initial surface. This scheme is shown in FIG. 22, and for instance the first data recording layer is decided as the initial surface, and TOC data is recorded at a header section of the recording area. In this TOC data area, TOP data concerning all of the first to m-th data recording layers is recorded discretely.

By reading the TOC data recorded as described above previously in the step of initialization, quick response to random access becomes possible when instructed later.

As another method, as shown in FIG. 23, by providing a TOC area in each data recording area, TOC data concerning all of the first to m-th data recording layers may be recorded in each of the TOC areas. With this configuration, the TOC data for the entire disk can be read from any data recording surface without especially deciding an initial surface.

Before starting description of the Matter 9, discussion is made for a case (A) where a read light passes through the substrate 11 and data recording surfaces $S_1$ to $S_{i-1}$ and is focused on the data recording surface $S_1$ to read the data recording surface $S_1$. In this case, a return light reflected on the data recording surface $S_1$ again passes through the data recording surfaces $S_1$ to $S_{i-1}$, and is guided through the substrate 11 into a light receiving system not shown herein. Herein assuming that a reflection factor of the data recording surface $S_1$ which is a bottom layer is 100% and a transmission factor between the substrate 11 and the data recording surface $S_1$ and that between each data recording surface are α respectively, a quantity of return light from the substrate 11 is represented by α 21. For in stance, in a case where the transmission factor is 90% and a number of laminated data recording surfaces is 10, α is 0.9 and i is 10, so that a quantity of obtained return light is only 12% of a quantity of read light introduced into the disk when the latter is assumed as 100%. In this estimation, a reflection factor of the data recording surface $S_1$ is 100%, but if the data recording surface $S_1$ has the same reflection factor and transmission characteristics as those of other data recording surfaces, a quantity of return light from the substrate 11 is expressed by $α^{i-1} (α-1) α^{i-1}$. In this case, assuming that α is 0.9 and i is 10, a quantity of return light of return light is only 1.5% against a quantity of incident read light introduced into a disk assumed as 100%, which is further smaller as compared to the former case. Thus, in the structure in which a plurality of data recording surfaces are laminated, to enable a read light pass through intermediate data recording surfaces and read the bottom layer, it is necessary to make higher a transmission factor of each of the intermediate data recording layers, but if a transmission factor of a data recording layer is made higher, a read light is not fully reflected on a data recording surface to be read, and an adequate quantity of return light can not be obtained, which is a contradiction.

So the effort was made to find a method of obtaining a full quantity of return light for only a data recording surface to be read, namely a data recording surface on which a read light is being focused currently, and the fact was found out that an energy density varies in each data recording surface and that in a data recording surface, on which a read light is being focused, is the highest one. For instance, assuming that a distance t between data recording surfaces is 200 μm, numerical aperture NA of an objective lens is 0.5, and a refractive index n between each data recording surface is 1.5, in a case (B) where a read light is focused on the data recording surface $S_3$, a diameter of a read light spot on the data recording surface $S_2$ as obtained through approximation is 200÷1.5×0.5×2=132 μm. A diameter of a read light spot at a focused point is around 1 μm, so that an energy density of a read light on the data recording surface $S_2$ is less than 1/100 of that on the data recording surface $S_3$, and thus it can be understood that a difference of energy density between adjoining data recording surfaces is quite large.

In relation to the present matter, the difference in energy density of a read light between data recording surfaces is utilized, and a material showing a reflection factor corresponding to the light energy density is employed for each of the reflecting layers constituting the data recording surfaces $S_1$ to Si. Namely each data recording layer is formed with a light reflecting material having the characteristics that, when a read light is focused thereon and the light energy density goes up to the maximum level, the reflection factor remarkably goes up and has a relatively transmission factor in other cases. As the data recording film as described above, a photochromic film, a thermochromic film, or a phase-changing film or the like can be enumerated. With the multi-layers recording disk in which each data recording surface is formed with the data recording film as described above, a desired data recording surface can be read out with a single read light. A data recording surface, on which a read light is being focused, reflects an incident read light with a high reflection factor because of the characteristics as described above, and on the other hand, a data recording surface, on which a read light is not being focused currently, allows transmission of the incident read light with a higher transmission factor, so that a quantity of elements modulated by a data recording surface on which a read light is being focused is contained in a return light from the disk, and a quantity of elements modulated by data recording surfaces on which the read light is not being focused is quite small. For this reason, read signals in a data recording surface to be read can efficiently be read from the return light.

Also in relation to this matter, the difference in light energy density between data recording surfaces as described above is utilized, and a material showing a reflection band corresponding to a light energy density is used for reflecting layers constituting the data recording surfaces $S_1$ to Si. Namely a data recording film is formed with a light-reflecting material having the characteristics that wavelength elements different from that of a read light are reflected when the read light is focused thereon and the light energy density goes up to the maximum level and reflects wavelength elements equivalent to that of the read light in other cases. As the data recording film as described above, a photoluminescence film, a luminescent dye film, a light semiconductor film or the like can be enumerated. Also in a multi-layered recording disk in which each data recording surface is formed with such a data recording film as described above, a desired data recording surface can be read with a single read light. On a data recording surface on which a read light is being focused currently, a light having a second wavelength different from that of an incident read light is reflected because of the characteristics described above, and at the same time on a data recording surface on which the read light is not being focused currently, a light having a first wavelength identical to that of the incident read light is reflected, so that a light having the second wavelength modulated by the data recording surface on which a read light is being focused and a light having the first wavelength modulated by data recording surfaces on which the read light is not being focuses are contained in the return light from the disk. Thus the light having the second wavelength is extracted from the return light, and extracted elements are used as read signals from the data recording surface to be read.

Figure 24:
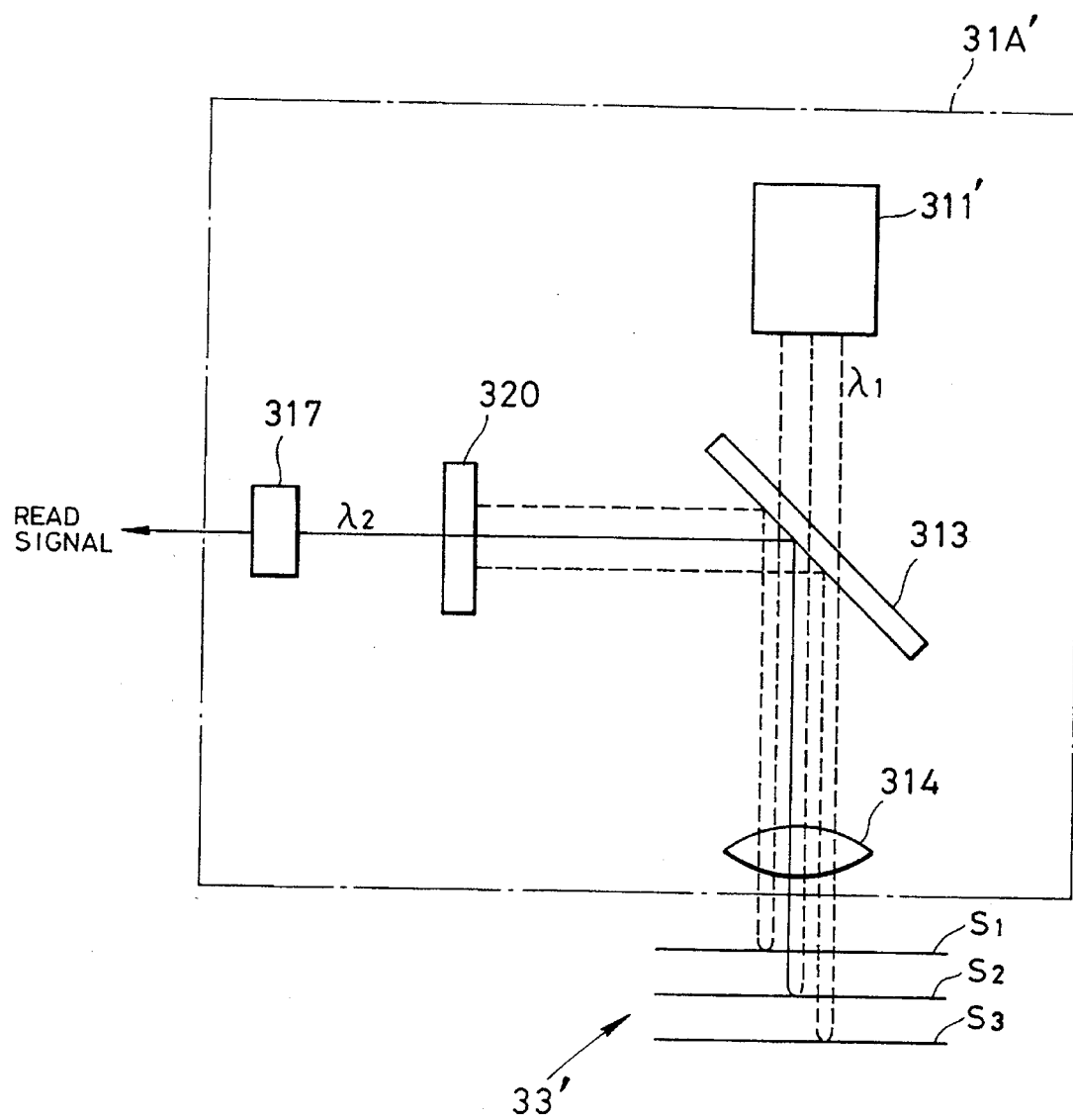
FIG. 24 is a block diagram illustrating configuration of a reproducing system for reading recorded signals in the multi-layered disk according to the present invention.

An example of a reproducing system including a second wavelength extracting means is shown in FIG. 24, in which the same reference numerals are allocated to the same portions as those in FIG. 18.

In FIG. 24, a laser beam having the wavelength of $λ_1$ from a light source 311' is irradiated as a read light through the half mirror 313 and an objective lens 314 to an optical disk 33' in which a material showing a reflection band corresponding to a light energy density is employed for each of the reflecting layers forming the data recording surfaces $S_1$, $S_2$, and $S_3$ as described above. When focus control is executed so that the read light to the optical disk 33' is focused on the central data recording surface $S_2$, a light energy density on the data recording surface $S_2$ increases, and a portion of the read light having a wavelength of $λ_1$ introduced onto the data recording surface $S_2$ is converted to a reflected light having a wavelength of $λ_2$. At the same time, other elements of the read light having the wavelength of λ1 reach the data recording surfaces $S_1$ and $S_3$, but herein the light energy density is very low, so that the read light having the wavelength of $λ_1$ is reflected as it is. Thus a return light having the wavelength of $λ_1$ and a return light having the wavelength of $λ_2$ can be obtained from the disk 33', and the light elements are guided via the objective lens 314 and a half mirror 313 to an optical filter 320. The filter 320 carries an extracting means allowing passage of only light element having the wavelength of $λ_2$, interrupts a return light having the wavelength of $λ_1$ from the half mirror 313, and supplies only a return light having the wavelength of $\lambda_2$ to a photodetector 317. For this reason, the detector 317 can receive only the return light modulated by recording signals in the data recording surface $S_2$ to be read. The detector 317 can supply electrical signals each corresponding to a quantity of received light as read signals to a signal processing system not shown herein.

FIG. 24 shows a simulated light path in a form different from the practical one to clearly show changes of wavelengths. Also it is desirable to use the objective lens 314 and half mirror 313 each showing the same optical characteristics to both the wavelength $\lambda_1$ and wavelength $\lambda_2$. Furthermore a disk having data recording layers each corresponding to a light energy density is not limited to the reflecting type as described above, and also a transparent type is allowable.

As described above in detail, with the multi-layered recording disk according to the present invention, against a reproduction level obtained when a read light is focusing on one of a plurality of data recording surfaces, a ratio of a reproduction level obtained when the read light is defocusing on other data recording surfaces is 1/N (N is a real number larger than 1), and a distance t between each data recording surface, numerical aperture NA of an objective lens guiding the read light to any of the plurality of recording surface, a wavelength $\lambda$ of a read light, an equivalent refractive index n between each data recording surface, and a number i of laminated data recording surfaces satisfy the following relation:

$$1.4 n\lambda/(NA)^2 \leq t \leq 7.5 n^3\lambda/(n^2-1)(NA)^4(i-1)$$

and a defocus aberration more than a specified value and at the same time a spherical aberration less than a specified value are maintained, so that it is possible to provide a multi-layered disk which can further improve a data recording density, record signals in good conditions, and allows reading and reproduction of the recorded signals smoothly, and a recording system as well as a reproducing system using the same.

What is claimed is:

1. A multi-layered recording disk with a plurality of data recording surfaces laminated therein, wherein data signals are recorded in each of the data recording surfaces in a band where, against a reproduction level obtained when a read light is on-focus to one of said data recording surfaces, a ratio of a reproduction level obtained when said read light is defocusing to a second one of said data recording surfaces is 1/N (N is a real number larger than 1), and a distance t between each of said data recording surfaces, numerical aperture NA of an objective lens guiding said read light to one of the data recording surfaces, wavelength $\lambda$ of said read light, an equivalent refractive index n between each of said data recording surfaces, and a number i representing the number of said laminated data recording surfaces satisfy the following relation:

$$1.4\ n\lambda/(NA)^2 \leq t \leq 7.5\ n^3\lambda/\{(n^2-1)(NA)^4(i-1)\}.$$

2. A method of producing a multi-layered recording disk, said multi-layered recording disk having a plurality of data recording surfaces laminated therein, said method comprising the steps of:

setting a band of data signals being recorded in each of the data recording surfaces so that, against a reproduction level obtained when a read light is focusing to one of said data recording surfaces, a ratio of reproduction level obtained when said read light is defocusing to a second one of said data recording surfaces is 1/N, wherein N is a real number larger than 1, and forming said multi-layered recording disk so that a distance t between each of said data recording surfaces, a numerical aperture NA of an objective lens guiding said read light to one of the data recording surfaces, a wavelength $\lambda$ of said read light, an equivalent refractive index n between each of said data recording surfaces, and a number i representing the number of said laminated data recording surfaces satisfy the following relation:

$$1.4\ n\lambda/(NA)^2 \leq t \leq 7.5\ n^3\lambda/\{(n^2-1)(NA)^4(i-1)\}.$$

3. A reproducing system for reproducing a data signal from a multi-layered recording disk, wherein said multi-layered recording disk has a plurality of data recording surfaces laminated therein, and data signals are recorded in each of the data recording surfaces in a band in which, against a reproduction level obtained when a read light is focusing to one of said data recording surfaces, a ratio of a reproduction level obtained when said read light is defocusing to a second one of said data recording surfaces is 1/N, wherein N is a real number larger than 1, and a distance t between each of said data recording surfaces, a numerical aperture NA of an objective lens guiding said read light to one of the data recording surfaces, a wavelength $\lambda$ of said read light, an equivalent refractive index n between each of said data recording surfaces, and a number i representing the number of said laminated data recording surfaces satisfy the following relation:

$$1.4\ n\lambda/(NA)^2 \leq t \leq 7.5\ n^3\lambda/\{(n^2-1)(NA)^4(i-1)\},$$

said reproducing system comprising:

means for irradiating said read light on said data recording surfaces; and means for receiving light of said read light from a desired one of said data recording surfaces.

4. A multi-layered recording disk according to claim 1, wherein the distance t between each of said data recording surfaces satisfies the following relation:

$$10\ \mu m \leq t \leq 7.5\ n^3\lambda/\{(n^2-1)(NA)^4(i-1)\}$$

5. A multi-layered recording disk according to claim 1, wherein N is 10.

6. A method according to claim 2, and further comprising the step of recording data with data signals each comprising run length limited code within said band on said data recording surface.

7. A method according to claim 2, and further comprising the step of recording data with data signals each formed according to a partial response system within said band on said data recording surface.

8. A method according to claim 2, and further comprising the step of recording data with data signals each formed according to a carrier modulation system within said band on said data recording surface.

9. A method according to claim 8, and further comprising the step of basing said carrier modulation system on an FM modulation system.

10. A multi-layered recording disk according to claim 1, wherein each of said data recording surfaces comprises a light-reflecting layer and a refractive index of said data recording surface closer to a side from which said read light comes in is lower.

11. A multi-layered disk according to claim 1, wherein from which said data recording surfaces comprises a light-reflecting layer and a light-reflection band of each data recording surface differs from the others.

12. A reproducing system according to claim 3, wherein each of said data recording surfaces comprises a light-reflecting layer, a light-reflection band of each data recording surface differs from the others, and a read light having a wavelength matching said light-reflecting band is irradiated to a data recording surface from which data signals are to be reproduced.

13. A multi-layered disk according to claim 1, wherein a refractive index of the data recording surface closer to a side wherein said read light comes in against said read light having a first wavelength is larger in a case where said read light is irradiated together with an additional light having a second wavelength which is different from said first wavelength than that in a case where only said read light having the first wavelength is irradiated.

14. A reproducing system according to claim 3, wherein a refractive index of the data recording surface closer to a side wherein said read light comes in against said read light having a first wavelength is larger in a case where said read light is irradiated together with an additional light having a second wavelength which is different from said first wavelength than that in a case where only said read light having the first wavelength is irradiated, and wherein said reproducing system uses a read light having a single signal wavelength and has an additional light irradiating means for irradiating said additional light at least to a reading point when reading, of said data recording surfaces, the one closer to a side where said read light comes in.

15. A reproducing system according to claim 14, wherein said reproducing system has a pick-up for irradiating said read light and said pick-up incorporates said additional light irradiating means.

16. A reproducing system according to claim 14, wherein said additional light irradiating means is controlled to turn ON or OFF irradiation to said reading point according to a data recording surface to be read.

17. A multi-layered recording disk according to claim 1, and further comprising a liquid crystal layer sandwiched by a pair of transparent electrode layers and interposed between one of said data recording surfaces closer to a side where said read light is incident and a second one of said data recording surfaces.

18. A multi-layered recording disk according to claim 17, and further comprising two exposed and ring-shaped conductive bodies provided on an external surface of a disk at the side where said read light comes in, and wherein said transparent electrode layers are discretely connected to said ring-shaped conductive bodies respectively.

19. A multi-layered recording disk according to claim 1, wherein a recording or reading direction in at least one of said data recording surfaces is contrary to that in a second one of said data recording surfaces.

20. A multi-layered recording disk according to claim 1, wherein TOC data concerning the data recording surfaces of the plurality of data recording surfaces is recorded in at least one of said data recording surfaces.

21. A multi-layered recording disk according to claim 1, wherein each of said data recording surfaces is formed with a light-reflecting layer, and said light-reflecting layer is made from a light-reflecting material showing a reflection factor corresponding to an energy density of said read light.

22. A multi-layered recording disk according to claim 1, wherein each of said data recording disk is formed with a material changing a wavelength of said read light according to an energy density of said read light.

23. A reproducing system according to claim 15, wherein said additional light irradiating means is controlled to turn ON or OFF irradiation to said reading point according to a data recording surface to be read.

24. A reproducing system according to claim 3, wherein each of said data recording surfaces has a liquid crystal layer sandwiched by a pair of transparent electrode layers and interposed between one of said data recording surfaces closer to a side where said read light is incident and a second one of said data recording surfaces, wherein two exposed and ring-shaped conductive bodies are provided on an external surface of a disk in the side where said read light comes in, wherein said transparent electrode layers are discretely connected to said ring-shaped conductive bodies respectively, wherein said reproducing system has two brushes each contacting each of said ring-shaped conductive bodies respectively, and wherein a voltage driving circuit is provided for loading a voltage via said brushes to said ring-shaped conductive bodies, when reading a data recording surface to be read closer to a side where read light comes in, to darken said liquid crystal layer.

25. A reproducing system according to claim 3, wherein a recording or reading direction in at least one of said data recording surfaces is opposite to that in a second one of said data recording surfaces, and wherein reading is started in response to a start instruction from a first of inner side and outer side positions in one of the data recording surfaces, after a final signal in the data recording surface is read, an operation for focusing a read light on a second data recording surface is executed at a second of said inner and outer side positions, and reading is restarted from the second of said inner and outer side positions in the second one of said data recording surfaces.

26. A reproducing system according to claim 3, wherein said data recording disk is formed with a material changing a wavelength of said read light according to an energy density of said read light, said reproducing system further comprising a read light generating means for emitting a read light having a wavelength, an extracting means for extracting light elements subjected to wavelength conversion by said data recording surfaces of reflected or transmitted lights obtained when said read light is introduced into said multi-layered recording disk, and a light-receiving means for receiving light elements extracted by said extracting means and generating read signals corresponding to the light elements.

\* \* \* \* \*